(12) United States Patent
Liebman et al.

(10) Patent No.: US 12,246,282 B1
(45) Date of Patent: Mar. 11, 2025

(54) SEALING DOOR VALVES FOR LOW DEAD VOLUME REACTOR CHAMBER

(71) Applicant: CARBON CAPTURE INC., Los Angeles, CA (US)

(72) Inventors: Noah David Liebman, Los Angeles, CA (US); Peter Ciulla, Los Angeles, CA (US); Rachel Shiomi Ozer, Los Angeles, CA (US)

(73) Assignee: CARBON CAPTURE INC., Los Angeles, CA (US)

( * ) Notice: Subject to any disclaimer, the term of this patent is extended or adjusted under 35 U.S.C. 154(b) by 0 days.

(21) Appl. No.: 18/625,644

(22) Filed: Apr. 3, 2024

Related U.S. Application Data

(63) Continuation of application No. 18/421,645, filed on Jan. 24, 2024.

(60) Provisional application No. 63/481,206, filed on Jan. 24, 2023.

(51) Int. Cl.
*B01D 53/04* (2006.01)
*B01D 53/62* (2006.01)

(52) U.S. Cl.
CPC .... *B01D 53/0446* (2013.01); *B01D 2257/504* (2013.01)

(58) Field of Classification Search
CPC .......................... B01D 53/04; B01D 53/0446; B01D 53/0407; B01D 2257/504
USPC .............................. 55/502; 96/108, 147, 151
See application file for complete search history.

(56) References Cited

U.S. PATENT DOCUMENTS

| | | | | |
|---|---|---|---|---|
| 1,698,320 | A | * | 1/1929 | Sharp ..................... B65D 51/30 96/148 |
| 3,223,147 | A | * | 12/1965 | Holloway ................. E06B 3/94 160/84.09 |
| 3,269,061 | A | | 8/1966 | Massina |
| 4,693,730 | A | | 9/1987 | Miller et al. |
| 4,816,121 | A | | 3/1989 | Keefer |
| 4,822,383 | A | | 4/1989 | Brose |

(Continued)

FOREIGN PATENT DOCUMENTS

| | | | |
|---|---|---|---|
| CN | 210699417 | U * | 6/2020 |
| JP | 2023-182287 | * | 12/2023 |

(Continued)

OTHER PUBLICATIONS

Machine-generated English translation of CN 210699417 U, published Jun. 9, 2020.*

(Continued)

*Primary Examiner* — Frank M Lawrence, Jr.
(74) *Attorney, Agent, or Firm* — RAPHAEL BELLUM PLLC

(57) ABSTRACT

Adsorbent reactors for removing carbon dioxide (CO2) from the atmosphere with several types of sealing door valves, ranging from a single valve element to multiple valve elements, are provided. The sealing door valves are configured to open to allow gases into the reactor, such as allowing ambient air to enter during adsorption, and can close to seal the reactor, such as allowing vacuum conditions to be created inside the reactor and/or steam to be injected into the reactor during desorption. The valves are designed to create minimum resistance to valve motion, minimum obstruction to gas flow when open, minimum allowance of fluid passage when closed, and to minimize dead space within the reactor.

20 Claims, 24 Drawing Sheets

(56) References Cited

U.S. PATENT DOCUMENTS

| | | | |
|---|---|---|---|
| 5,547,648 | A | 8/1996 | Buchanan et al. |
| 7,393,373 | B1 * | 7/2008 | Krippner ............. B29C 45/1701 55/385.2 |
| 8,058,569 | B2 | 11/2011 | Kline |
| 8,272,401 | B2 | 9/2012 | McLean |
| 8,282,715 | B1 | 10/2012 | Degenstein et al. |
| 8,715,587 | B1 * | 5/2014 | Downs ............... B01D 53/0407 55/342 |
| 9,878,286 | B2 | 1/2018 | Eisenberger |
| 10,232,305 | B2 | 3/2019 | Gebald |
| 10,427,086 | B2 | 10/2019 | Gebald et al. |
| 2008/0282883 | A1 | 11/2008 | Rarig et al. |
| 2020/0047116 | A1 | 2/2020 | Eisenberger |
| 2021/0016220 | A1 | 1/2021 | Elliott et al. |
| 2023/0415089 | A1 | 12/2023 | Janett |

FOREIGN PATENT DOCUMENTS

| | | | |
|---|---|---|---|
| WO | 2020/212146 | A1 | 10/2020 |
| WO | 2021138743 | A1 | 7/2021 |

OTHER PUBLICATIONS

Machine-generated English translation of JP 2023-182287, published Dec. 26, 2023.*

Elfving, et al., "Experimental comparison of regeneration methods for CO2 concentration from air using amine-based adsorbent", Chemical Engineering Journal, 2021, 404, 126337, 1-13.

Li et al., "Steam-Stripping for Regeneration of Supported Amine-Based CO2 Adsorbents", Communications; D01: 10.1002/CSSC. 201000131; ChemSusChem 2010, 3, 899-903.

Sanz-Perez et al., "Direct Capture of CO2 from Ambient Air", Chem. Rev. 2016, 116, 11840-11876.

Samanta et al., "Post-Combustion CO2 Capture Using Solid Sorbents: A Review", Ind. Eng. Chem. Res. 2012, 51, 1438-1463.

Wijesiri et al., "Desorption Process for Capturing CO2 from Air with Supported Amine Sorbent", Ind. Eng. Chem. Res. 2019, 58, 15606-15618.

Bos et al., "Production of high purity CO2 from air using solid amine sorbents", Chemical Engineering Science: X 2 (2019) 100020, 1-11.

International Search Report and Written Opinion of the International Search Authority for PCT/US24/12789, dated Apr. 24, 2024.

* cited by examiner

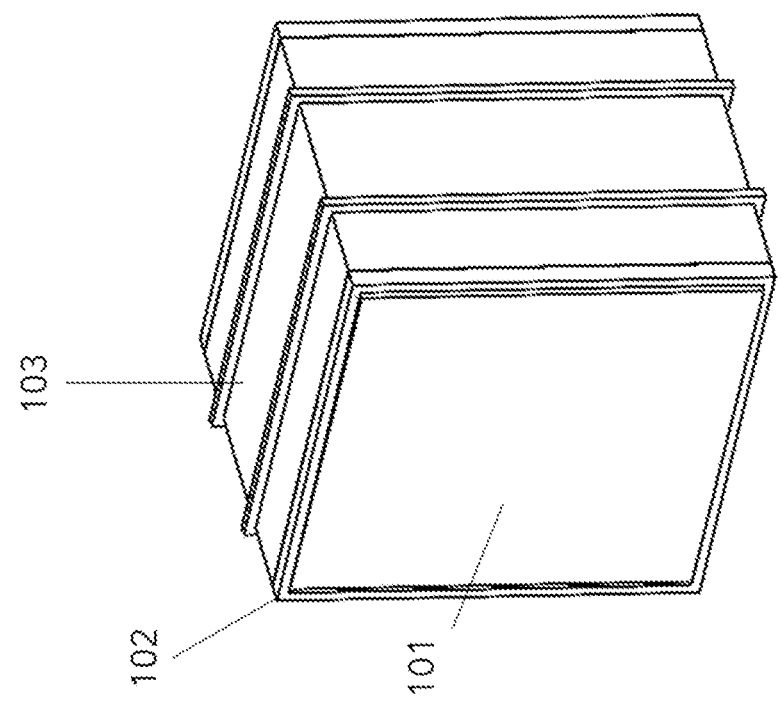
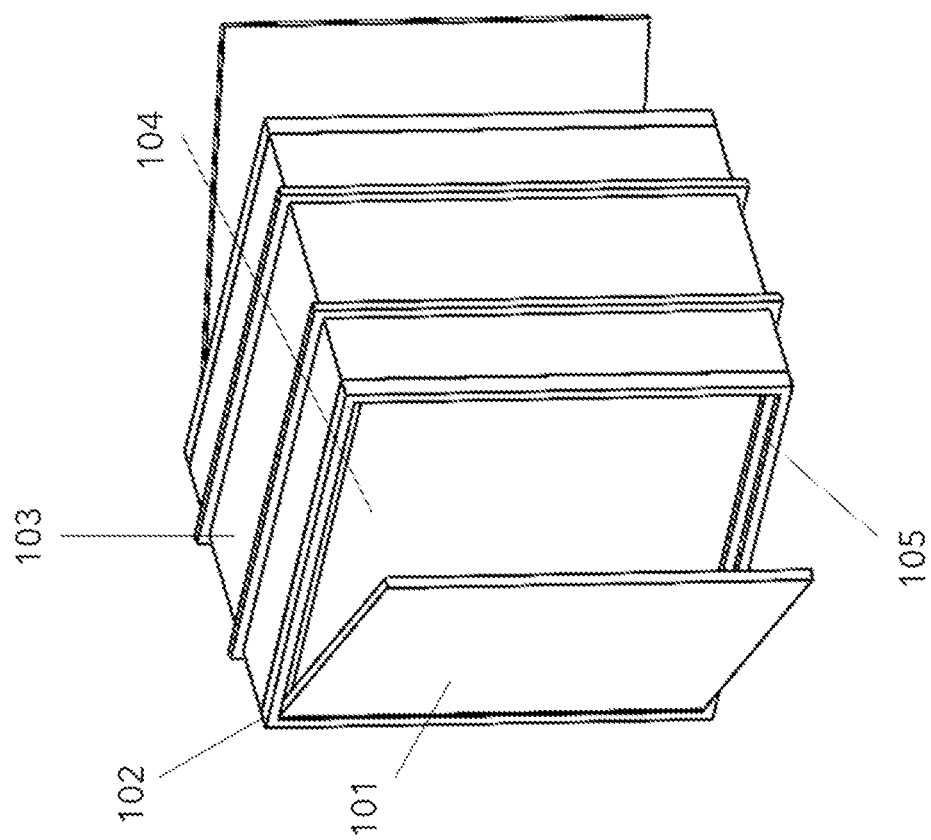
FIG. 2A
FIG. 2B

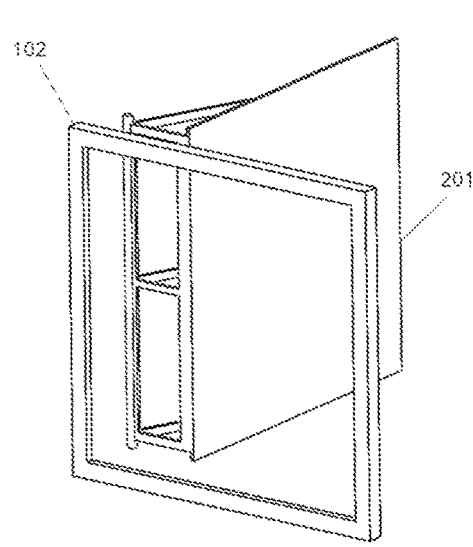
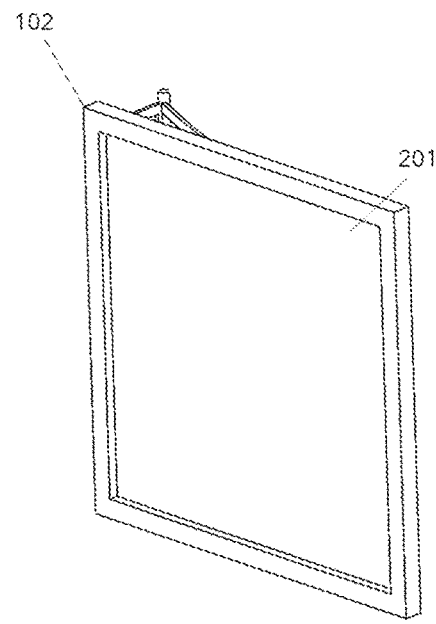
FIG. 3A
FIG. 3B
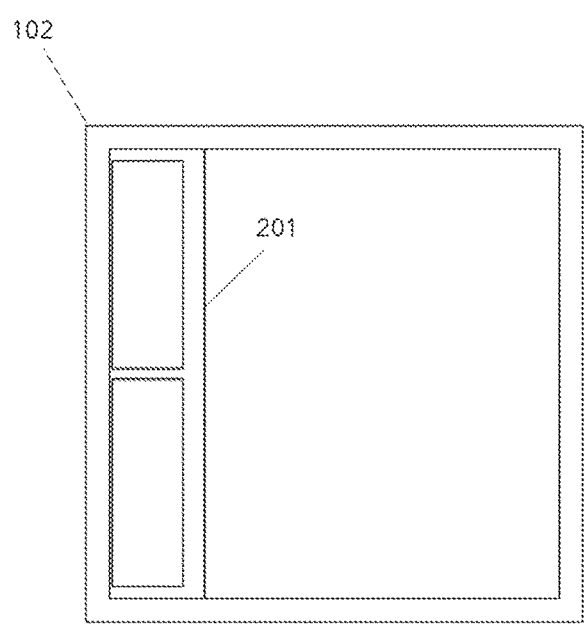
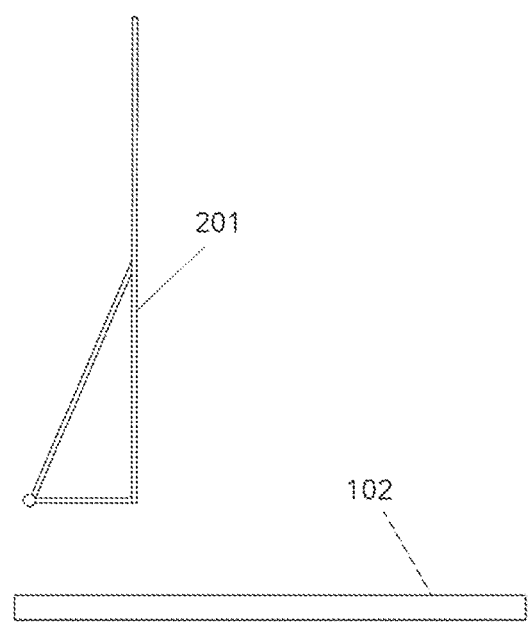
FIG. 3C
FIG. 3D

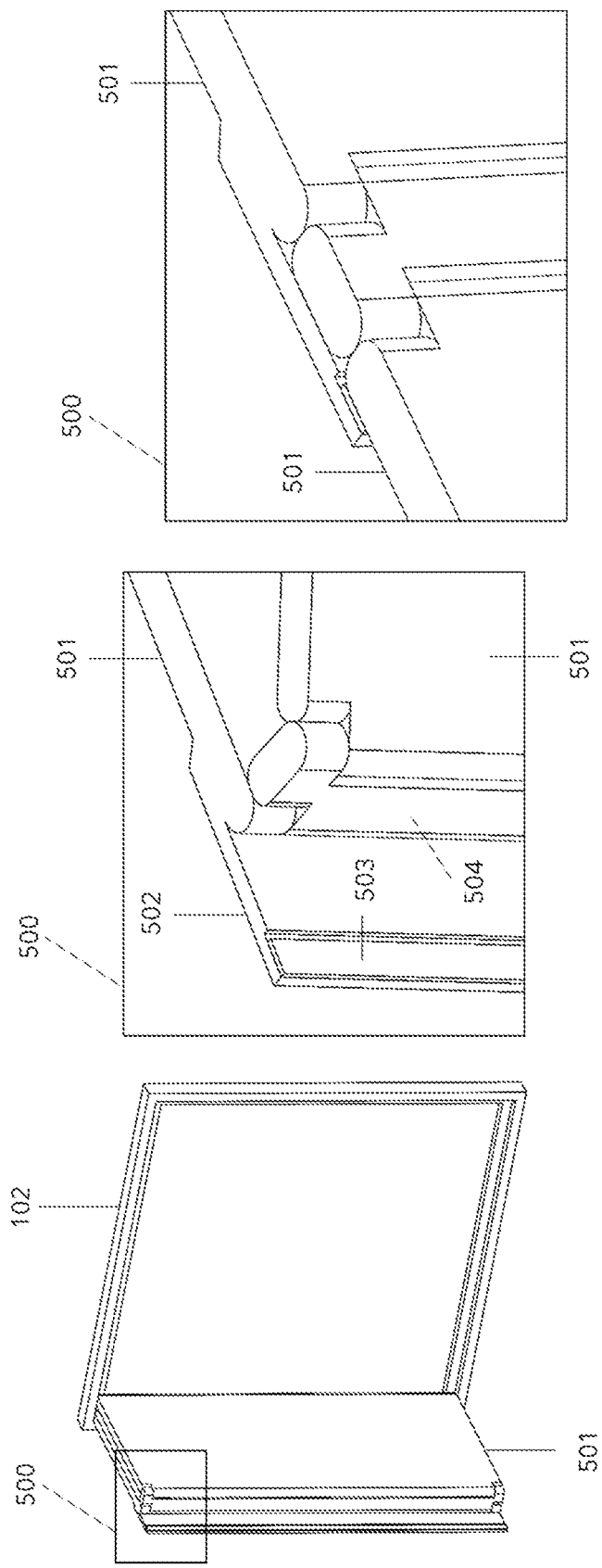

SEALING DOOR VALVES FOR LOW DEAD VOLUME REACTOR CHAMBER

CROSS-REFERENCE TO RELATED APPLICATIONS

This application is a Continuation of application Ser. No. 18/421,645, filed on Jan. 24, 2024, which claims benefit of priority from U.S. Provisional Application No. 63/481,206, filed on Jan. 24, 2023, the entire contents of each are incorporated by reference.

TECHNICAL FIELD

The invention relates to devices and systems for sealing vacuum- and temperature-rated reactors while maintaining a low dead volume within the sealed reactor and allowing high gas flow rates when open. More specifically, the invention relates to sealing door valves useful for treatment and separation of gases including the direct capture and separation of carbon dioxide ($CO_2$) from the atmosphere or $CO_2$ point sources, such as flue gases.

BACKGROUND

Global warming is posing devastating effects on our climate, health, and communities. Coastal flooding due to rising sea levels, extended wildfire seasons, as well as more destructive hurricanes are the direct impacts of climate change. Moreover, global food and water security are at stake. There is a consensus among scientists that global warming is directly linked to the increase in the level of greenhouse gases in the atmosphere. Carbon dioxide ($CO_2$) is a major greenhouse gas, and its concentration in the atmosphere has sharply increased over the past century due to the burning of fossil fuels. Although efforts are underway to move toward renewable energy sources that do not emit greenhouse gases, shifting our energy supply to completely renewable sources is not possible in the near term and requires further technological advancements and significant global investments. Therefore, there is a growing need for technologies that can efficiently capture carbon dioxide from the flue gas of power plants and other industrial processes and, increasingly, even from ambient air. The latter is known as direct air capture (DAC).

$CO_2$ capture processes commonly utilize some type of regenerable adsorbent bed to capture the $CO_2$ from a gas or air stream (see, for example, Sanz-Pérez, et al., *Chemical Reviews*, 2016, 116, 11840-11876, which is incorporated in this disclosure in its entirety). A common approach basically involves a first step of moving ambient air or flue gas through a bed of a solid or semi-solid sorbent that is effective at selectively capturing a significant portion of the $CO_2$ contained therein. Once the sorbent reaches a level of significant saturation of $CO_2$, it needs to be regenerated in a second step. During regeneration, the adsorbent bed is treated with, for example, heat, vacuum, steam, a purge gas, or some combination thereof to cause the $CO_2$ to desorb from the sorbent. The released $CO_2$ is subsequently captured, and the regenerated sorbent can then be returned to the first step and reused to capture more $CO_2$. Due to the low concentrations (currently a little over 400 parts per million) of $CO_2$ in ambient air, high volumes of ambient air need to be moved and processed in a DAC process, so the systems need to be highly efficient. A major contributor to system efficiency is the minimization of pressure drops throughout the reactor, particularly the minimization of any fluid flow obstructions. Obstructions to flow through the reactor create large energy losses given the large volumetric flow rate of ambient air.

Common solid $CO_2$ sorbents include various zeolites or molecular sieves; amine-functionalized silicious, inorganic, activated carbon, graphitic, metal organic framework (MOF) or polymeric supports; amine-functionalized carbon, glass, cellulosic, or polymeric fibers; and basic or weakly basic ion exchange resins (see, for example, Samanta, et al., *Industrial & Engineering Chemistry Research*, 2012, 51, 1438-1463, which is incorporated in this disclosure in its entirety). In some cases, the solid $CO_2$ sorbents are utilized in powder or pellet form in fluidized bed or packed bed configurations through which air is passed. In other cases, the solid $CO_2$ sorbents are utilized in fibrous webs, mats, or woven fabrics through which air is passed. In still other cases, the solid $CO_2$ sorbents are formed into structured monoliths or other structured forms such as sheets, films, membranes, or plates through or around which air may be passed. Sorbents structured in a sheet-type form may be conveniently mounted within a supporting cartridge to form parallel-plate contactor structures which may be mounted within an adsorbent reactor chamber. Gases and/or fluids may then be flowed through the contactors with a relatively low-pressure drop compared with, for example, packed bed configurations.

The captured $CO_2$ is desorbed during the sorbent regeneration process, which usually involves some combination of applying heat and vacuum to the adsorbent bed to effect desorption. This process is commonly known as temperature-vacuum swing adsorption (TVSA) and has been researched and reported in the literature (see, for example, Elfving, et al., *Chemical Engineering Journal*, 2021, 404, 126337, which is incorporated in this disclosure in its entirety). A particular version, known in the art as steam-assisted TVSA, utilizes heat from steam, flowing steam through the adsorbent bed to efficiently transfer heat to the adsorbent bed as described in, for example, U.S. Pat. No. 4,822,383 (Brose, et al.), Li, et al., *ChemSusChem*, 2010, 3, 899-903, Wijesiri, et al., *Industrial & Engineering Chemistry Research*, 2019, 58, 15606-15618 and Bos, et al., *Chemical Engineering Science: X*, 2019, 2, 100020, which are incorporated in this disclosure in their entirety. Steam is also an effective carrier to sweep away gaseous $CO_2$ as it is being desorbed, thereby promoting increased desorption by way of reducing the partial pressure of the gas above the sorbent as described in, for example, U.S. Pat. No. 10,279,306 (Gebald, et al.), which is incorporated in this disclosure in its entirety. Steam is particularly effective as a carrier gas because the latent heat associated with a phase change is far greater than the sensible heat associated with a temperature change. The phase change of steam results in local vacuums that form where the sorbent is coldest in the reactor, encouraging uniform heating across the sorbent bed.

In TVSA or steam-assisted TVSA systems, the adsorbent bed generally resides within a reactor chamber that must be capable of managing the alternating air and steam flows over a wide range of temperatures while being evacuable to a low pressure. Such conditions present a particular challenge for valves or gates that control the high-volume flow of air into the adsorbent reactor chamber and through the adsorbent bed. Valves currently commercially available are either not vacuum- or temperature-rated or occupy a large volume envelope both in terms of the valve itself as well as the space required for the valve to open and close. U.S. Pat. No. 10,232,305, which is incorporated in this disclosure in its entirety, describes a vacuum chamber for a DAC process with one or both axial walls sealed with a single circular steel lid plate which may be operated as a flap valve actuated with an actuation mechanism located exclusively at the face of the lid opposite to the interior space. Such valves require relatively complex mechanisms to effect opening and closing, require a large volume within which to operate, and lead to considerable flow resistance and disturbance. A major reason valves known in the art having a large volume envelope create inefficiencies in a DAC process is that they introduce additional dead volume (also called dead space or dead zones), defined as the volume within the reactor that is not taken up by the sorbent, process equipment, or other mechanisms. Air that fills dead volume inside the reactor or the valve must also be pumped out to maintain the purity of desorbed carbon dioxide, requiring longer evacuation cycles and more energy.

SUMMARY

This invention comprises several types of sealing door valves for adsorbent reactor chambers, ranging from a single valve element to several valve elements. The current concepts are mechanically simple and compatible with a range of actuation and clamping mechanisms. Additionally, while most valves are circular, these valves are primarily rectangular, allowing them to more easily integrate with reactors designed for sorbents with a rectangular form factor, such as, for example, reactors utilizing structured sorbents in a parallel plate configuration. This minimizes reactor dead space and flow disturbance related to transitioning from a circular valve to a rectangular reactor and vice-versa. Lastly, many of these concepts have valves that open and close in such a way that the frame can be placed flush against the reactor chamber internals, minimizing the amount of dead space within the reactor when the valve is closed.

The valve elements can open to allow fluid into the reactor, such as allowing ambient air to enter during adsorption, and can close to seal the reactor, such as allowing vacuum conditions to be created inside the reactor and/or steam to be injected into the reactor during desorption. The valves consist of valve elements as well as at least one valve frame, which is designed to create minimum resistance to valve motion, minimum obstruction to fluid flow when open, and minimum allowance of fluid passage when closed. The valve designs minimize dead space within the reactor chamber, which reduces the amount of energy required to evacuate the reactor, improves purity of the desorbed product, potentially reduces oxygenation of certain sorbents, and shrinks bypassing channels that might allow air or steam to bypass the sorbent. Minimizing dead space within and around the reactor also reduces the size and weight of the reactor, allowing for optimized packaging and weight at a module level when multiple reactors are placed in a module. The valves and frame may also be designed to minimize thermal mass, weight, size, and/or cost while also providing structural support to the reactor. Thermal mass is a particularly important characteristic to minimize in temperature swing adsorption processes because high energy losses are incurred by heating parasitic mass in addition to the sorbent in the reactor.

In one aspect of the invention, an air treatment apparatus for removing carbon dioxide ($CO_2$) from the atmosphere is provided, the air treatment apparatus including an adsorbent reactor chamber, two or more rectangular openings in the walls of the adsorbent reactor chamber, at least one valve frame affixed around each of the two or more rectangular openings, a door valve including one or more rectangular valve elements associated with each valve frame, at least one sealing element between the one or more rectangular valve elements and each valve frame, and at least one primary actuation mechanism for selectively moving the one or more rectangular valve elements between an open position and a closed position. When the one or more rectangular valve elements are in the open position a flow of gas may enter and exit the adsorbent reactor chamber through the two or more rectangular openings. When the one or more rectangular valve elements are in the closed position, the two or more rectangular openings of the adsorbent reactor chamber are sealed to prevent flow of gases into or out of the adsorbent reactor chamber through the two or more rectangular openings.

BRIEF DESCRIPTION OF THE DRAWINGS

These and other objects, features, and advantages of the invention will be more fully appreciated or become better understood when considered in conjunction with the accompanying drawings, where:

FIG. 2A shows an exemplary single-door valve attached to an exemplary adsorbent reactor in an open position in accordance with the invention;

FIG. 2B shows an exemplary single-door valve in a closed position in accordance with the invention;

FIGS. 3A, 3B, 3C, and 3D show several views of an exemplary single-door valve with an externally located or offset hinge axis in accordance with the invention;

FIGS. 10A, 10B, and 10C show exemplary linkage and sealing mechanisms for accordion-style door valves in accordance with the invention;

DETAILED DESCRIPTION

Figure 1B:
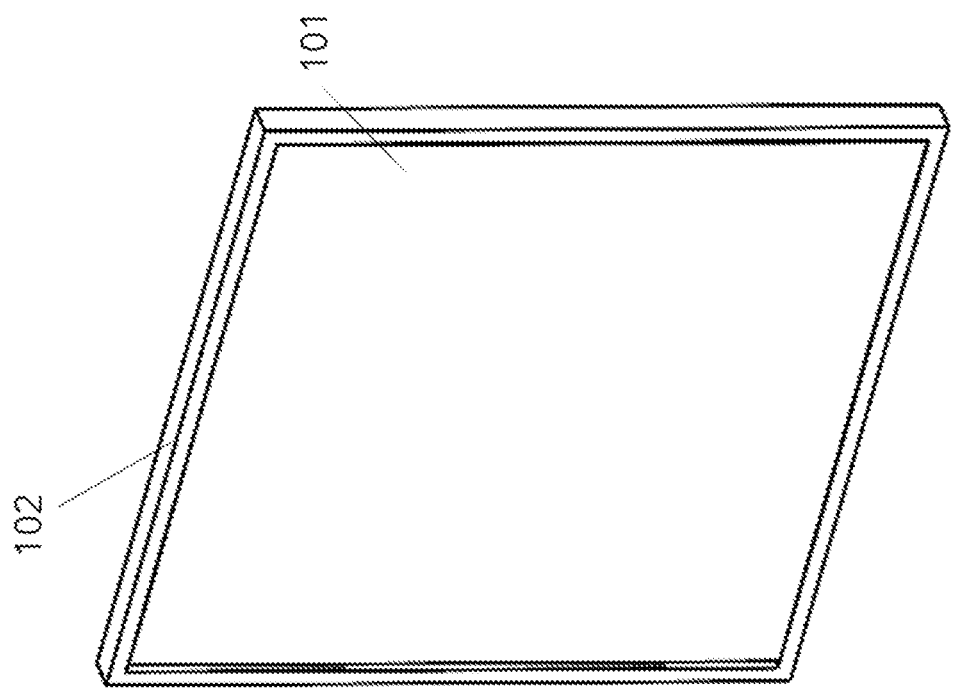
FIG. 1B shows an exemplary single-door valve in a closed position in accordance with the invention.

The present invention relates to improved devices and systems for adsorptive treatment of gas streams to remove impurities. In some embodiments, the present invention is particularly useful for adsorptive treatment of high-volume gas streams to remove impurities present in low quantities. In particular, the systems are useful for the removal of carbon dioxide ($CO_2$) from ambient air or other gas streams comprising $CO_2$. The technology utilizes novel sealing door valves affixed to adsorbent reactors used for TVSA and steam-assisted TVSA processes. In some exemplary embodiments of the invention, the door valves of the present invention comprise a valve frame, one or more valve elements, sealing elements between the valve elements and between the valve elements and the valve frame, and an actuation mechanism to open and close the valve elements. In some exemplary embodiments of the invention, the valve frame is attached to an outer wall of the adsorbent reactor, around a rectangular opening leading into the adsorbent reactor chamber. In some exemplary embodiments of the invention, the valve frame is made integral with the adsorbent reactor as a single contiguous element. In some exemplary embodiments, there are two door valves attached on opposite sides of an adsorbent reactor, one valve allowing inflow of gas into the adsorbent reactor chamber and the other valve allowing outflow of the treated gas from the adsorbent reactor chamber. In some exemplary embodiments, there are two or more door valves attached around rectangular openings at various locations around the outside of the adsorbent reactor. In some exemplary embodiments, there are three or more door valves attached around rectangular openings at various locations around the outside of the adsorbent reactor. The door valve can be located on any face of the adsorbent reactor and can be located on multiple faces of the adsorbent reactor. Furthermore, the door can be oriented horizontally, vertically, or along any other axis, and rotate and/or translate vertically, horizontally, or along any other axis.

The valve elements are actuated, movable panes or doors that alternate between a closed and open position. The closed position typically does not allow any flow through the valve, and the open position typically allows minimally obstructed flow through the valve. In some exemplary embodiments of the invention, the flow is normal to the plane of the frame in the event that the frame is planar but in other exemplary embodiments, the flow occurs at an angle and/or the frame is non-planar. In some exemplary embodiments of the invention, the door is non-planar. In some exemplary embodiments of the invention, the valve elements comprise sealing elements such that in a closed position no fluid can flow in any direction through the valve. The sealing elements can seal the interfaces between valve elements and/or the interfaces between the valve elements and the frame. In some exemplary embodiments, the valve is oriented such that the seal is self-energizing, i.e., where the application of vacuum internal to the reactor serves to add to the pressure of the valve against the sealing faces. The sealing material may be compressed a first percentage of its thickness by the application of an actuation mechanism when the valve element is closed and may be further compressed a second percentage of its thickness upon the application of vacuum internal to the reactor. In a self-energizing seal, the sealing element is more compressed after the second compression than after the first compression, i.e., the thickness of the sealing element as a percentage of its total thickness after the second compression is lower than the thickness of the sealing element as a percentage of its total thickness after the first compression. In some exemplary embodiments of the invention, the sealing material is compressed between 5% and 55% when the valve door is closed by an actuation mechanism and is further compressed between 10% and 60% upon the subsequent application of vacuum internal to the reactor. In another exemplary embodiment, the sealing material is compressed between 15% and 45% when the valve door is closed via actuation and is compressed between 20% and 50% when vacuum is applied. In another exemplary embodiment, the sealing material is compressed between 25% and 35% when the valve door is closed via actuation and is compressed between 30% and 40% when vacuum is applied. For example, calculations using characteristics of an exemplary valve in accordance with the invention and having an exemplary sealing material found that the valve compresses the sealing material 25% by the application of the secondary actuation mechanism and 37% when vacuum is applied internal to the reactor.

Sealing elements for the types of mechanically simple valves can be attached to the valve elements or to the valve frame or to both. In some exemplary embodiments, the valve elements are planar with an overall shape that allows it/them to fill the space within the frame when the valve is closed. In some exemplary embodiments, the frame and valve elements are made of a rigid material, and the sealing elements are made of a softer material, such as elastomer. In some exemplary embodiments, the frame or valve elements are made of a metal such as aluminum or steel or alloys thereof. In some exemplary embodiments, the frame or valve elements are made of composite material such as glass- or carbon-fiber reinforced plastic. The valves in accordance with the invention repeatably and reliably hold and maintain vacuum over a range of temperatures from about −40° F. to about 250° F.

The valve elements can be of any number, but typically range from 1-50. In some exemplary embodiments, the valve frame is static while the valve elements move, but the reverse is true in other exemplary embodiments. In some exemplary embodiments, the valve frame and elements are rectangular, but in other exemplary embodiments, they are circular or other shapes. The valve elements are hinged and situated within the frame such that the door valve, when closed, sits nearly flush against the sorbent inside the adsorbent reactor chamber, minimizing the amount of dead space within the adsorbent reactor chamber when the valves are closed. This minimizes the channel size through which fluid, for example regeneration gas or steam, can move to bypass the sorbent bed inside the reactor chamber. Additionally, in TVSA processes where vacuum is applied, low reactor chamber dead volume enables more efficient evacuation.

In some exemplary embodiments where the door valve comprises two or more valve elements, overall adsorbent reactor space efficiency is realized. Door valves with a single valve element and that actuate via rotation require available axial space outside of the reactor at least equal to the width of the valve element, which, for example, limits how closely multiple adsorbent reactors may be spaced apart. For modular air processing systems where module units are of a standard fixed size, e.g., the size of a standard shipping container, reactor space efficiency is critical for maximizing the performance of each module. When multiple valve elements are utilized, the length along the fluid flow axis occupied by the valve when opening and closing is reduced, thereby increasing space efficiency of the reactor.

The door valves of the present invention are mechanically simple and compatible with a range of actuation mechanisms. In some exemplary embodiments, the valves are actuated via hydraulics, pneumatics, racks and pinions, or motors, but can also be actuated via springs, gears, belts, or other means. In some exemplary embodiments, the valve elements rotate about an axis, and that axis can be anywhere along the length of the valve elements, or even external to or offset from the valve element, or the valve element can actuate linearly. In some exemplary embodiments, the actuation mechanisms comprise at least one primary actuation mechanism that operates to rotate the valve elements about an axis and at least one secondary actuation mechanism that operates to actuate a clamping mechanism. In some exemplary embodiments, the valve elements comprise at least one clamping mechanism that operates to apply a force to the outside of the door valve to ensure a tight seal when the door is closed, guide the door valve into its final position when closed or closing, maintain compression of a sealing element, and cease exerting force when the door is opened. In some exemplary embodiments, the clamping mechanisms may be spaced to optimally distribute applied force from the actuation mechanism in the form of linear compressive force to close the valve door.

Additionally, most valves are circular, while, in some exemplary embodiments, these valves are primarily rectangular, allowing them to more easily integrate with reactors designed for sorbent with a rectangular form factor. This minimizes flow disturbances related to mating and transitioning from a circular valve to a rectangular reactor and vice versa. This also minimizes reactor dead space because additional dead space is usually created by the transition from round to square. Also, rectangular reactors, especially ones rated for vacuum, typically have doors that have to be manually unfastened and removed, while the inventive valves may be remotely actuated.

In some exemplary embodiments, the door valve and valve frame may be coated in a corrosion-resistant material such as, but not limited to, electroless nickel plating, zinc- or zinc-chromate electroplating, hot dip galvanization, spray-on epoxy, black oxide, black phosphate, or a coat of powder or paint. In some exemplary embodiments, a corrosion resistant material can be used for the door valve and the valve frame. The corrosion resistant material may or may not also be passivated for further corrosion protection. In some exemplary embodiments, the material comprising the door valve and the valve frame may be anodized or covered with a chemical film.

Figure 1A:
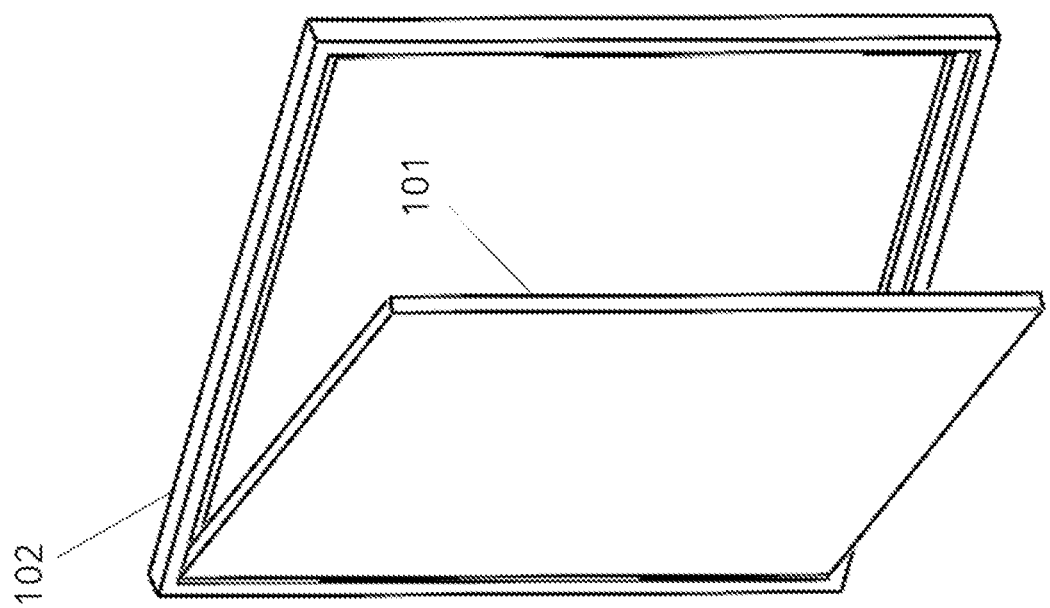
FIG. 1A shows an exemplary single-door valve in an open position in accordance with the invention.

FIGS. 1A and 1B show an exemplary single-door valve, with the valve element (101) and valve frame (102) called out. In FIG. 1A, the valve is shown in an open configuration and in FIG. 1B, the valve is shown in a closed configuration. FIGS. 2A and 2B show the same single-door valve, illustrated in FIGS. 1A and 1B, attached to a representative adsorbent reactor as, for example, might be utilized in a carbon capture system. FIG. 2A shows the valve door (101) open with respect to the reactor chamber (103) and contained sorbent (104) and FIG. 2B shows the valve door (101) closed within the valve element (102). Although exemplary FIGS. 1A, 1B, 2A, and 2B show the doors opening horizontally around a vertical hinge axis, the hinge axis may be either vertical or horizontal. Furthermore, the hinge axes of opposing doors need not necessarily be oriented in the same direction. As a nonlimiting example, a reactor with two single-door valves may have one door that opens around a vertical axis and the other door opening around a vertical hinge axis or a horizontal hinge axis. Lastly, the sealing surface (105) on the valve frame where the valve door seats when closed is shown.

FIGS. 3A, 3B, 3C, and 3D show a single-door valve similar to valve door (101) but with an externally located or offset hinge axis for the valve door (201). This allows more space for an actuation mechanism located on the shaft axis than would be available if that axis was located within the frame, or it may help to prevent a hinge or actuation mechanism located at one end of the valve from interfering with the sealing surface along the valve and frame face. Offsetting the valve axis from the valve face also potentially helps the valve element contact the seal more evenly around its perimeter. The door support structure shown is an example only and can be replaced by any other similarly functioning support structure. FIG. 3A shows the valve in an open state, while FIG. 3B shows it in a closed state. FIG. 3C shows a frontal view of the open valve, displaying an attachment structure connecting the rotating axis and the valve element that minimizes obstruction to airflow into and out of the reactor when open. FIG. 3D shows a top view of the same.

Figure 4A:
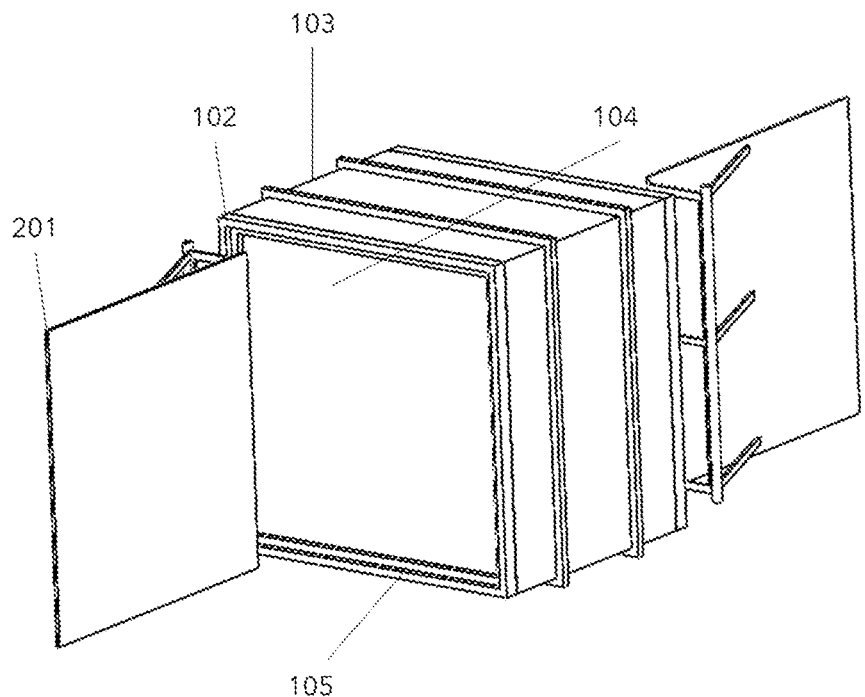
FIG. 4A shows an exemplary single-door valve with an externally located or offset hinge axis attached to an exemplary adsorbent reactor in an open position in accordance with the invention.
Figure 4B:
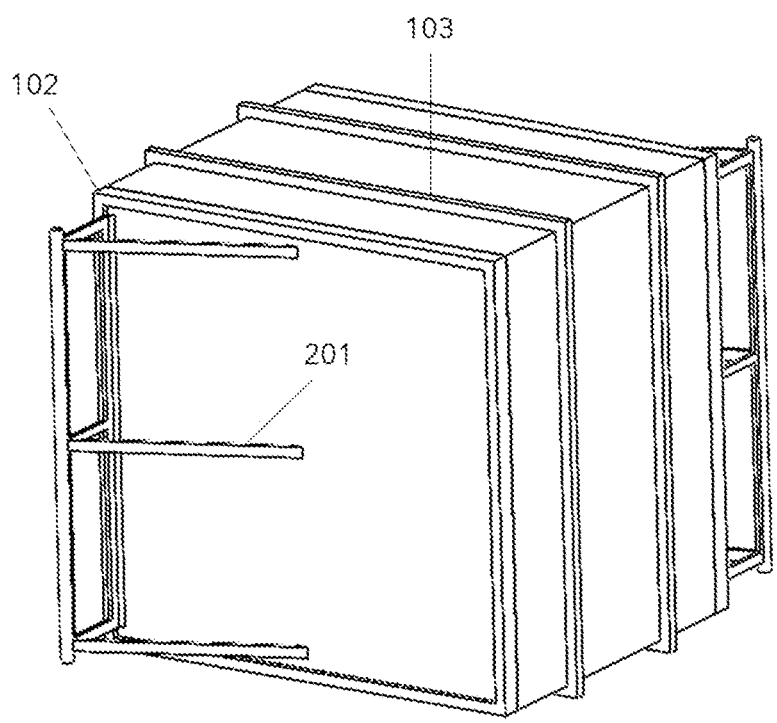
FIG. 4B shows an exemplary single-door valve with an externally located or offset hinge axis attached to an exemplary adsorbent reactor in a closed position in accordance with the invention.

FIGS. 4A and 4B show the valve doors (201) attached to a representative adsorbent reactor system. That is, two separate valve doors (201) are individually attached on either side of the adsorbent reactor system. FIG. 4A shows the representative adsorbent reactor system with both doors open and FIG. 4B shows the representative adsorbent reactor system with both doors closed. As indicated above for the single-door valves, the hinge axis of a double-door may be either vertical or horizontal, and the hinge axes of opposing doors need not necessarily be oriented in the same direction.

Figure 5B:
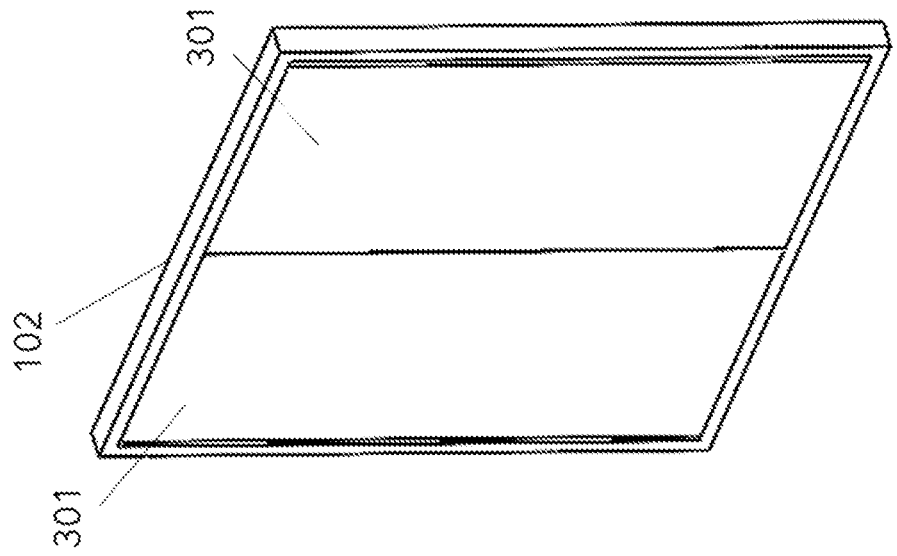
FIG. 5B shows an exemplary double-door valve in a closed configuration in accordance with the invention.
Figure 5A:
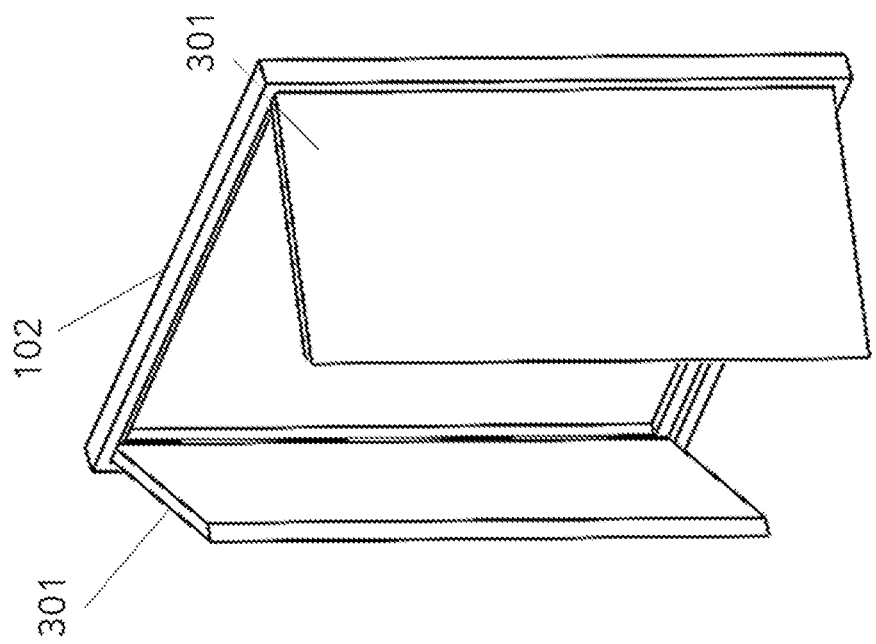
FIG. 5A shows an exemplary double-door valve in an open configuration in accordance with the invention.

FIGS. 5A and 5B show an exemplary double-door valve in accordance with the invention with a valve (301). Each of the exemplary double-door valves (301) independently articulates around an axis in the frame. FIG. 5A shows the double-door valves (301) in an open configuration and FIG. 5B shows the double-door valves (301) in a closed configuration.

Figure 6B:
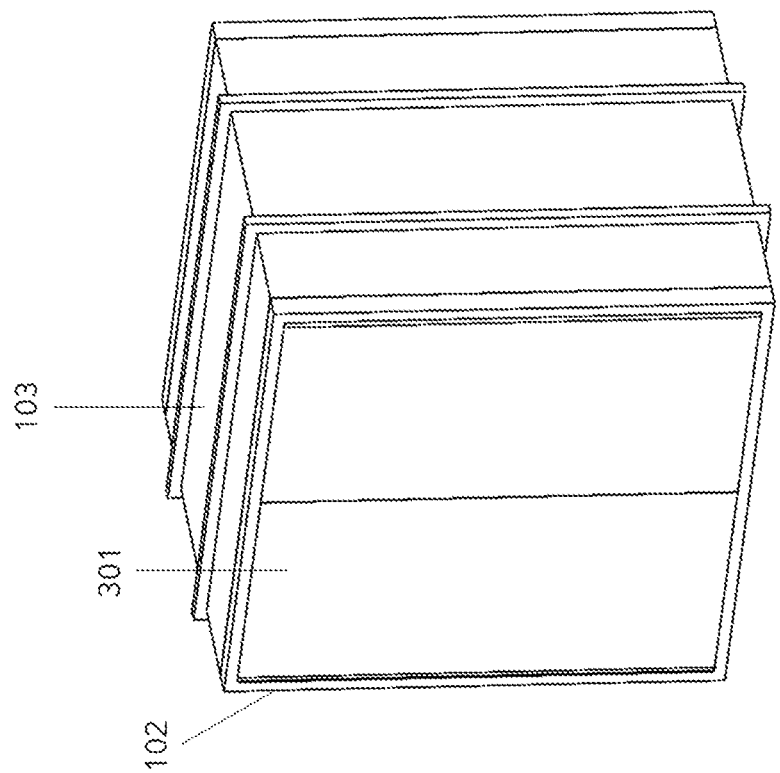
FIG. 6B shows an exemplary double-door valve attached to an exemplary adsorbent reactor in a closed configuration in accordance with the invention.
Figure 6A:
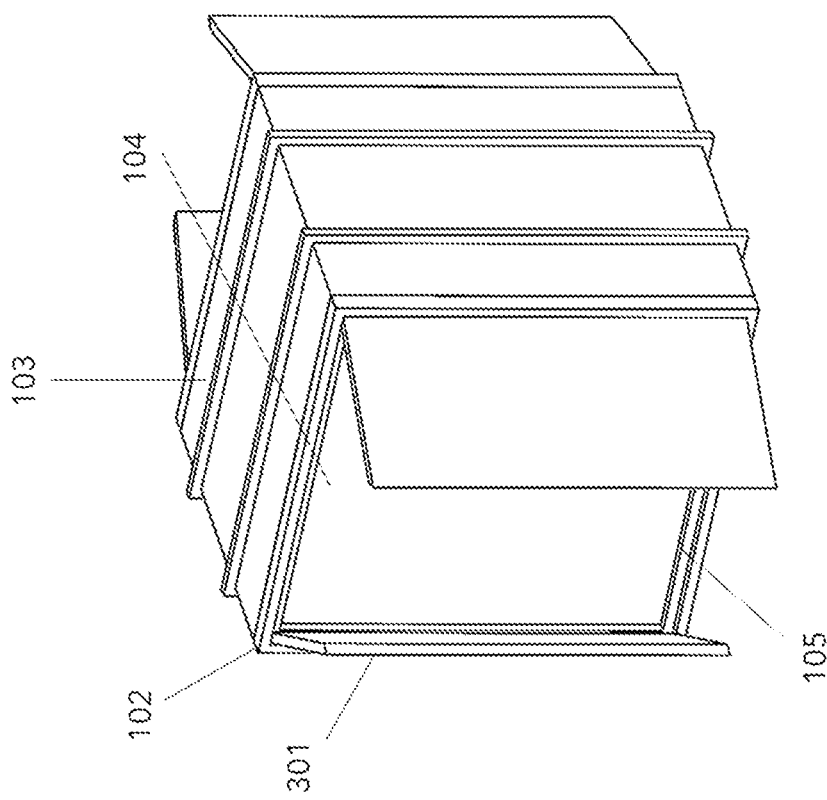
FIG. 6A shows an exemplary double-door valve attached to an exemplary adsorbent reactor in an open configuration in accordance with the invention.

FIGS. 6A and 6B show the double-door valve (301) attached to a representative adsorbent reactor system. That is, a double-door valve (301) is mounted on each side of the representative adsorbent reactor system. FIG. 6A shows a representative adsorbent reactor system with both of the double-door valves (301) open and FIG. 6B shows a representative adsorbent reactor system with both of the double-door valves (301) closed. As indicated above for the single-door valves, the hinge axis may be either vertical or horizontal, and the hinge axes of opposing doors need not necessarily be oriented in the same direction.

Figure 7A:
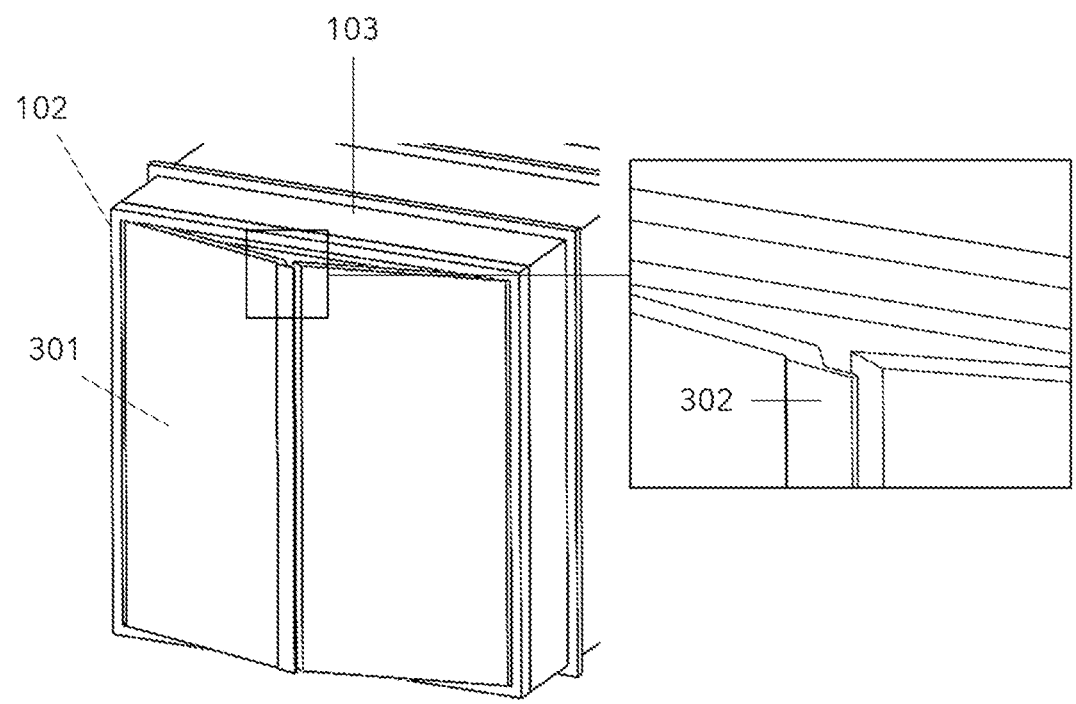
FIGS. 7A and 7B show exemplary sealing mechanisms for double-door valves in accordance with the invention.
Figure 7B:
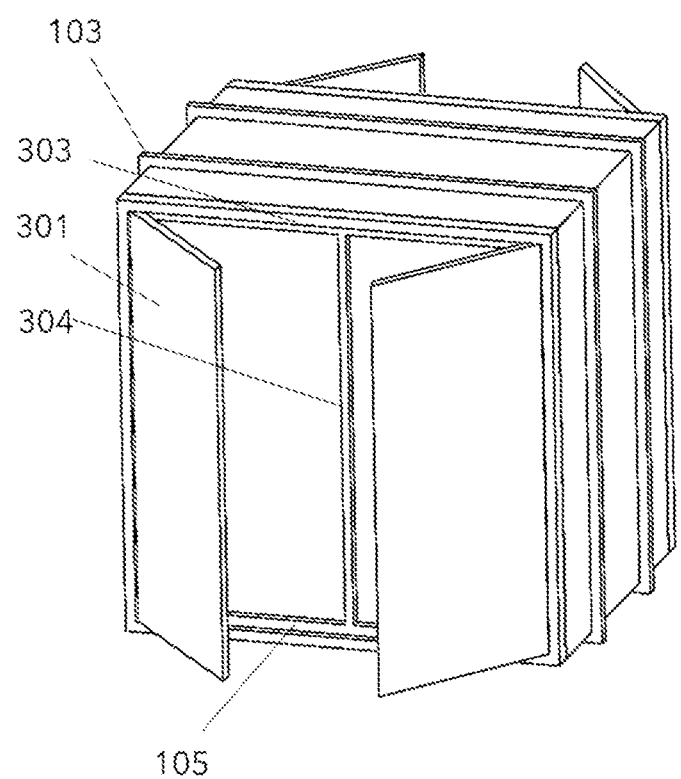

FIG. 7A shows an exemplary embodiment of a double-door valve with a lip (302) extending from one valve element (301) that creates an overlapping seal against the other valve element. FIG. 7B shows an exemplary embodiment of a double-door valve where a seal is created when both valve elements (301) contact a middle sill or post (304) attached to the valve frame (303). In some exemplary embodiments, an external member, such as a center post, can be moved into place linearly or by rotation to create a seal with the closed valve elements.

Figure 8B:
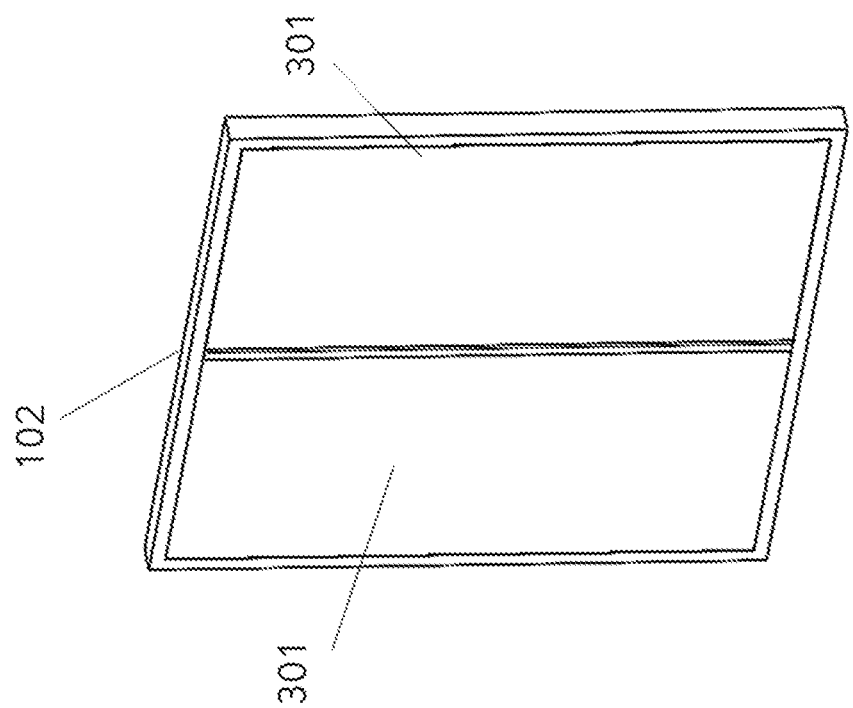
FIG. 8B shows an exemplary alternative center-hinged double-door valve attached to an exemplary adsorbent reactor in a closed configuration in accordance with the invention.
Figure 8A:
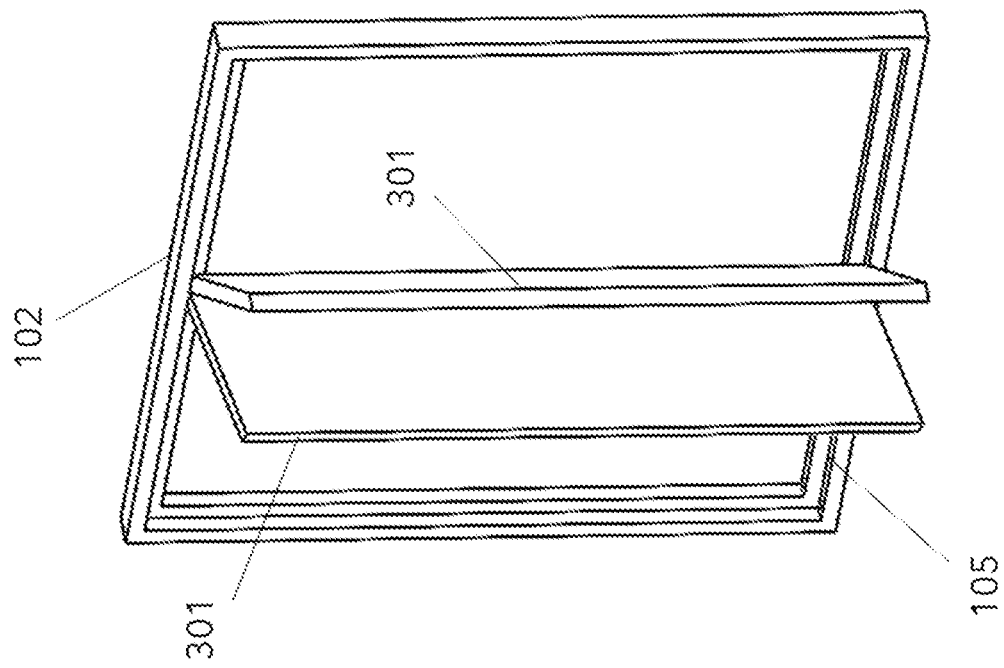
FIG. 8A shows an exemplary alternative center-hinged double-door valve attached to an exemplary adsorbent reactor in an open configuration in accordance with the invention.

FIGS. 8A and 8B show an exemplary double-door valve (301) in accordance with the invention where the hinges are located at the middle of the frame (102) rather than the outside of the frame. In FIG. 8A, the double-door valve (301) is shown in an open configuration and in FIG. 8B, the double-door valve (301) is shown in a closed configuration. The hinge axis may be either vertical or horizontal, and the hinge axes of opposing doors need not necessarily be oriented in the same direction.

Figure 9B:
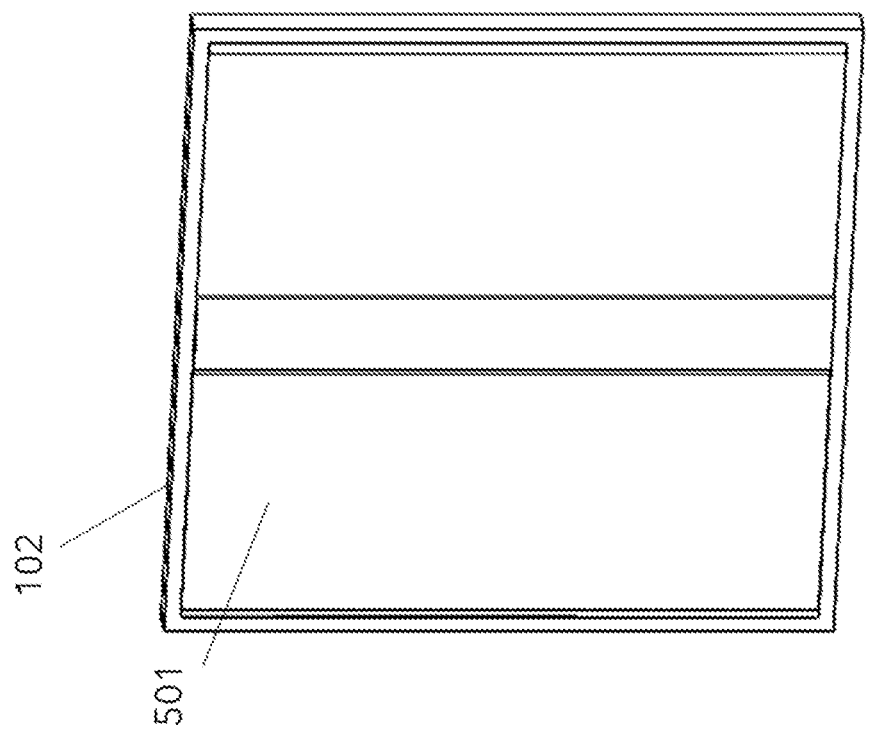
FIG. 9B shows an exemplary accordion-style door valve in a closed configuration in accordance with the invention.
Figure 9A:
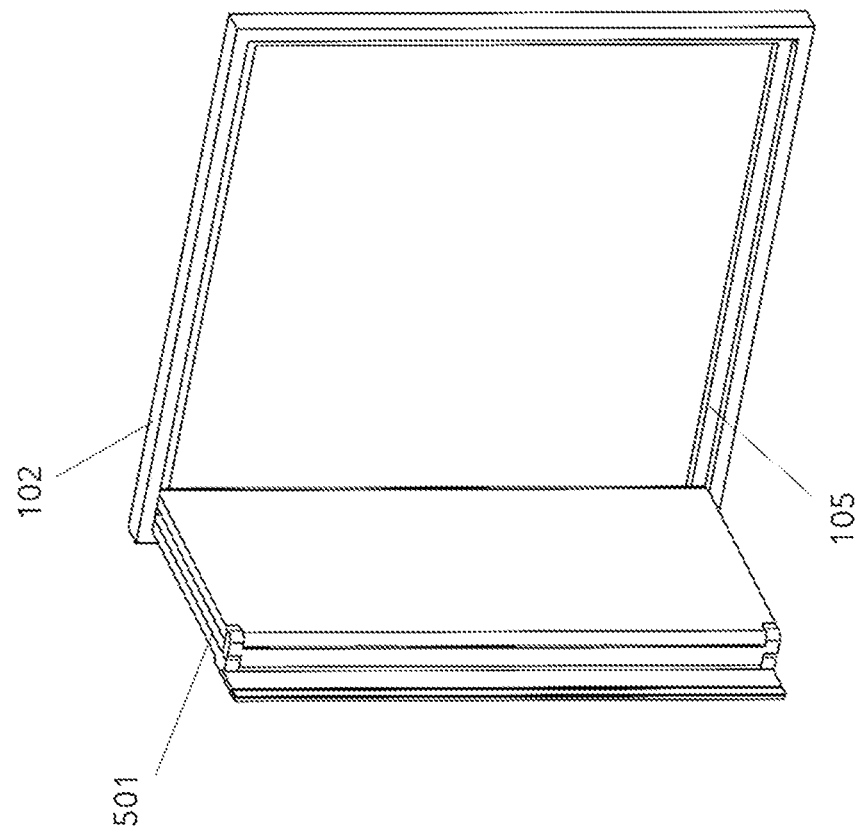
FIG. 9A shows an exemplary accordion-style door valve in an open configuration in accordance with the invention.

FIGS. 9A and 9B show an exemplary accordion style door valve in accordance with the invention with the valve (501). In FIG. 9A, the accordion system door valve is shown in an open configuration and in FIG. 9B, the accordion system door valve is shown in a closed configuration. In some exemplary embodiments, the accordion style door valve comprises 2-10 valve elements. In some exemplary embodiments, the accordion style door valve comprises 2-6 valve elements. In some exemplary embodiments, the accordion style door valve comprises 4 valve elements. In some exemplary embodiments, the accordion style door valve comprises 2 valve elements. Each valve element (501) can be linearly actuated by a guide peg at the top of the rightmost valve element when viewed from the front, causing the valve to close flush and seal against the frame as the peg moves rightwards within its channel. The valve can also be actuated by rotating the leftmost valve element about its hinge, with the guide peg on the rightmost element guiding the valve elements into their closed position. The valve may also be configured to alternatively open from left-to-right, top-to-bottom, or bottom-to-top in a similar fashion.

FIGS. 10A, 10B, and 10C show an exemplary sealing mechanism for an accordion style door. In FIG. 10A, the valve elements (501) are illustrated in an open configuration. FIG. 10B shows a detailed view (500) of the sealing mechanism when the valve elements (501) are in the open configuration. In FIG. 10B, the sealing mechanism includes a protruding lip (502) extending from the valve element (501) and an elastomeric seal (503). Connecting the seals of two different valve elements (501) is a linkage (504), which allows the valve to minimize its obstruction of airflow when the valve elements (501) are in a stowed (open) position. FIG. 10C shows a detailed view (500) of the exemplary sealing mechanism for the accordion style door when the valve elements (501) are in the closed configuration.

Figure 11B:
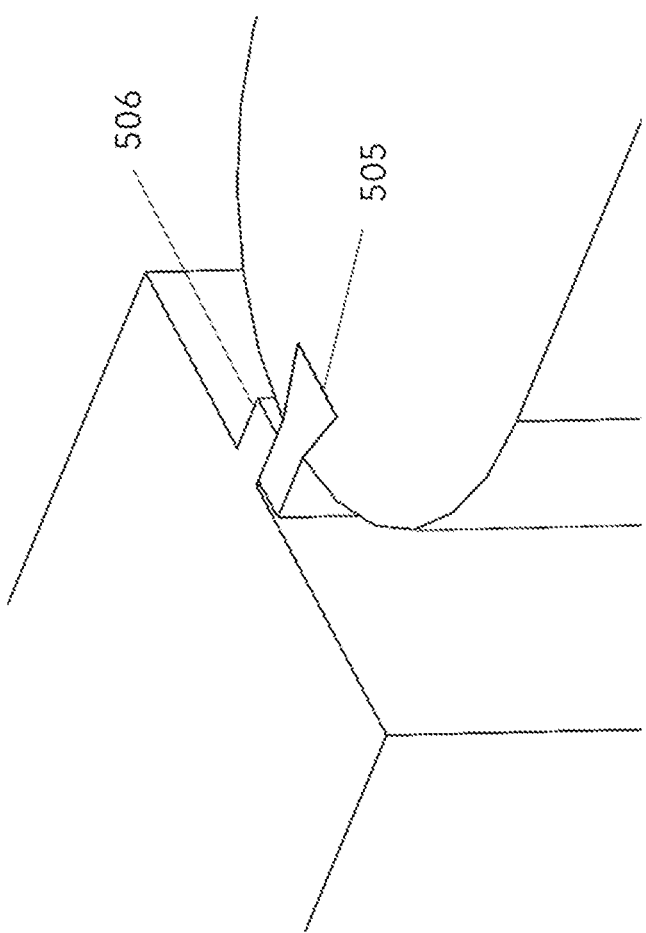
FIGS. 11A and 11B show alternate exemplary sealing mechanisms for accordion-style door valves in accordance with the invention.
Figure 11A:
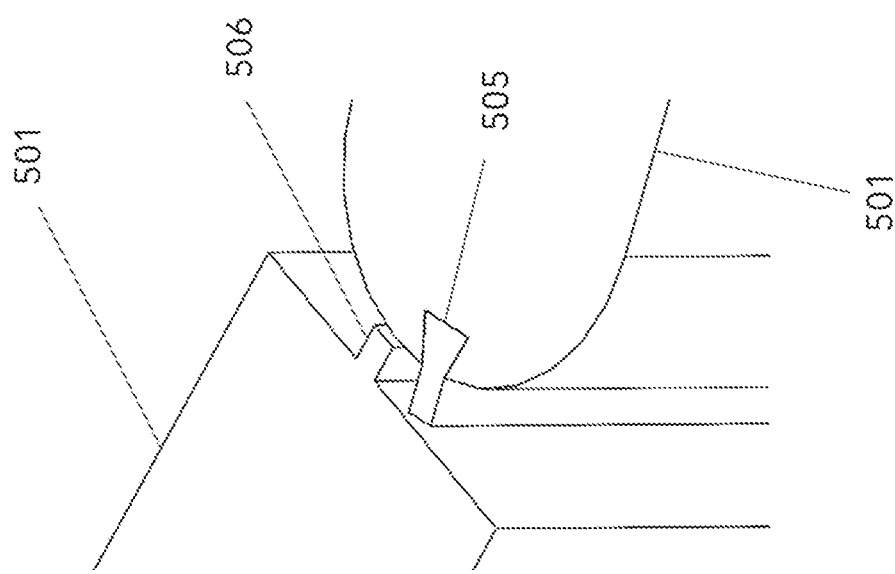

FIGS. 11A and 11B show an alternative embodiment of an accordion style door with an elastomeric seal (505) positioned within the joint between valve elements seating against a protruding feature (506) in the adjacent valve element. In FIG. 11A, the valve elements (501) are shown in an open configuration and FIG. 11B, the valve elements (501) are shown in a closed configuration. These two sealing approaches are included as examples only and do not limit the different ways in which an accordion style door valve in accordance with the invention could be sealed.

Figure 12B:
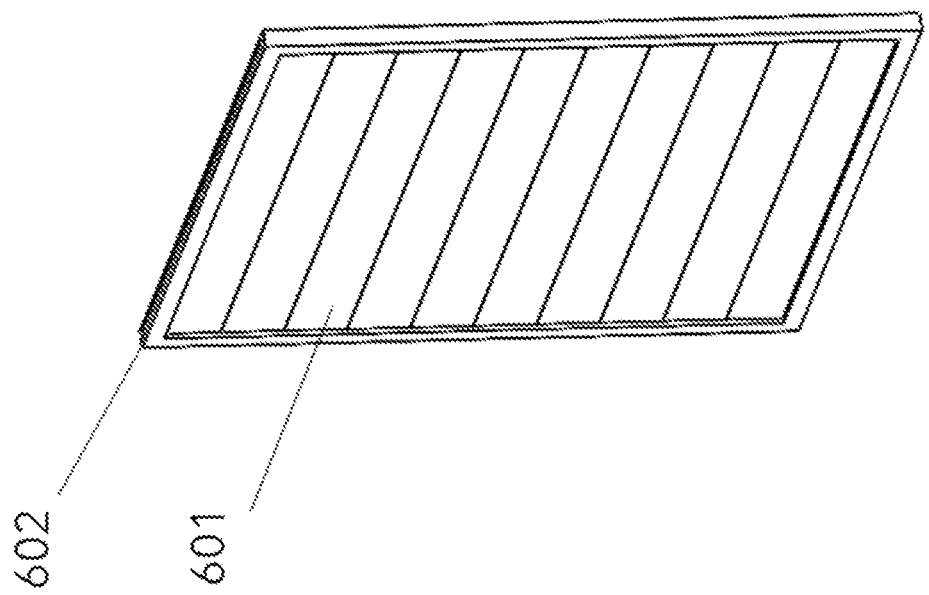
FIG. 12A shows an exemplary roll up door valve in an open configuration in accordance with the invention and FIG. 12B shows an exemplary roll up door valve in a closed configuration in accordance with the invention.
Figure 12A:
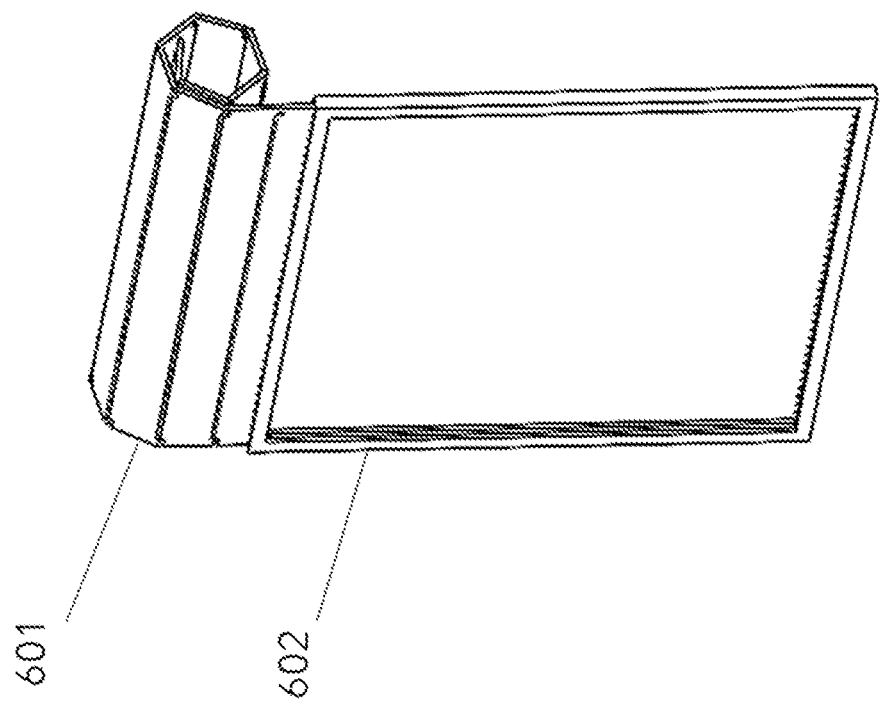

FIGS. 12A and 12B show an exemplary sectional roll up door valve in accordance with the invention. In FIG. 12A, the valve door sections (601) are shown in an open position. The section can roll up, stack, or lie flush in a different plane (such as perpendicular to the valve plane, for example) for stowing the valve elements in such a way that it minimizes the overall space required to house this valve and reactor in a container module housing one or multiple reactors while also not obstructing flow through the reactor. The valve sections (601) are contained within and pass through the frame (602) when transitioning from an open to a closed position and vice-versa. In some exemplary embodiments, the roll up style door valve comprises 4-50 valve elements. In some exemplary embodiments, the roll up style door valve comprises 5-35 valve elements. In some exemplary embodiments, the roll up style door valve comprises 10-25 valve elements. The roll up door valve may also be configured to alternatively open from left-to-right, top-to-bottom, or bottom-to-top in a similar fashion.

In terms of actuation, the valves can be opened by an actuator moving the topmost section, with each section raising the one below it. In another exemplary embodiment, the valves can be opened by an actuator moving the bottommost section, with each section pushing the sections above it. In FIG. 12B, the valve door sections (601) are shown in a closed position. Closing can be achieved by either lowering the topmost section and allowing gravity to lower the sections below it, or by actuating the lowest section to return it to its position at the bottom of the frame. Weights can be added to assist the gravity fed closing of the valve. In terms of raising the topmost valve element, it can be rolled up by a rotating shaft or linearly displaced by a rod or cable, or actuation can act on a different valve element.

Figure 13B:
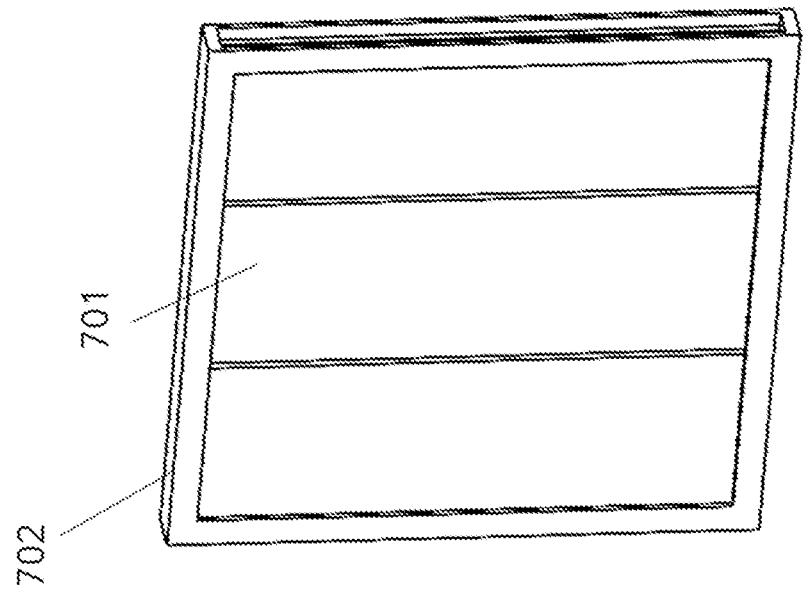
FIG. 13A shows an exemplary sliding door valve in an open configuration in accordance with the invention and FIG. 13B shows an exemplary sliding door valve in a closed configuration in accordance with the invention.
Figure 13A:
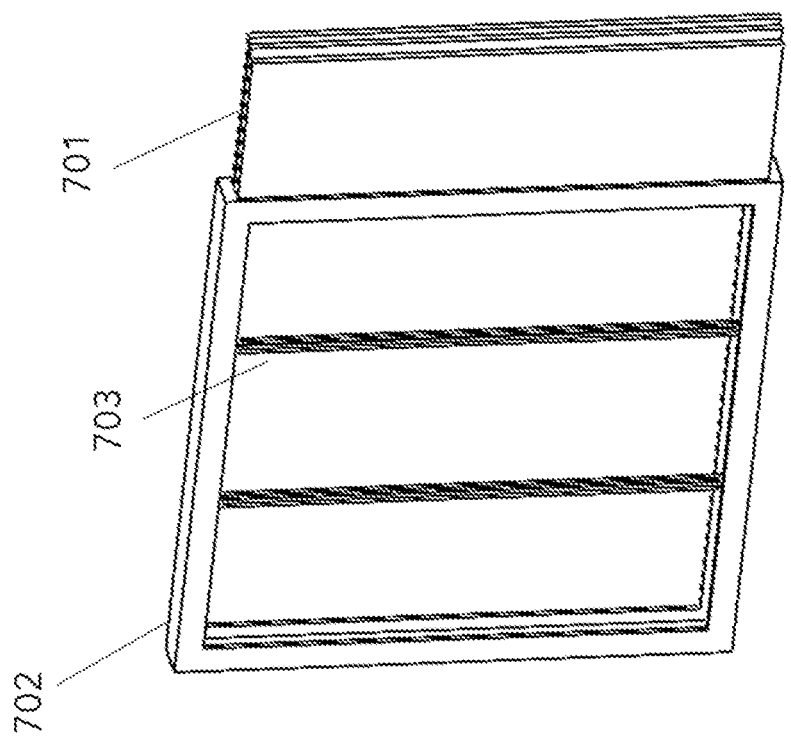

FIGS. 13A and 13B show an exemplary sliding-door valve in accordance with the invention. FIG. 13A shows the sliding-door valve in the open position and FIG. 13B shows the sliding-door valve in the closed position. In one exemplary embodiment, the valve elements (701) are panes that slide linearly from one side of the valve frame (702) where the panes are stowed when the valve is open into their final closed position inside the frame where the panes come to rest against vertical columns (703). The sliding-door valve may also be configured to alternatively open from left-to-right, top-to-bottom, or bottom-to-top in a similar fashion.

Figure 14:
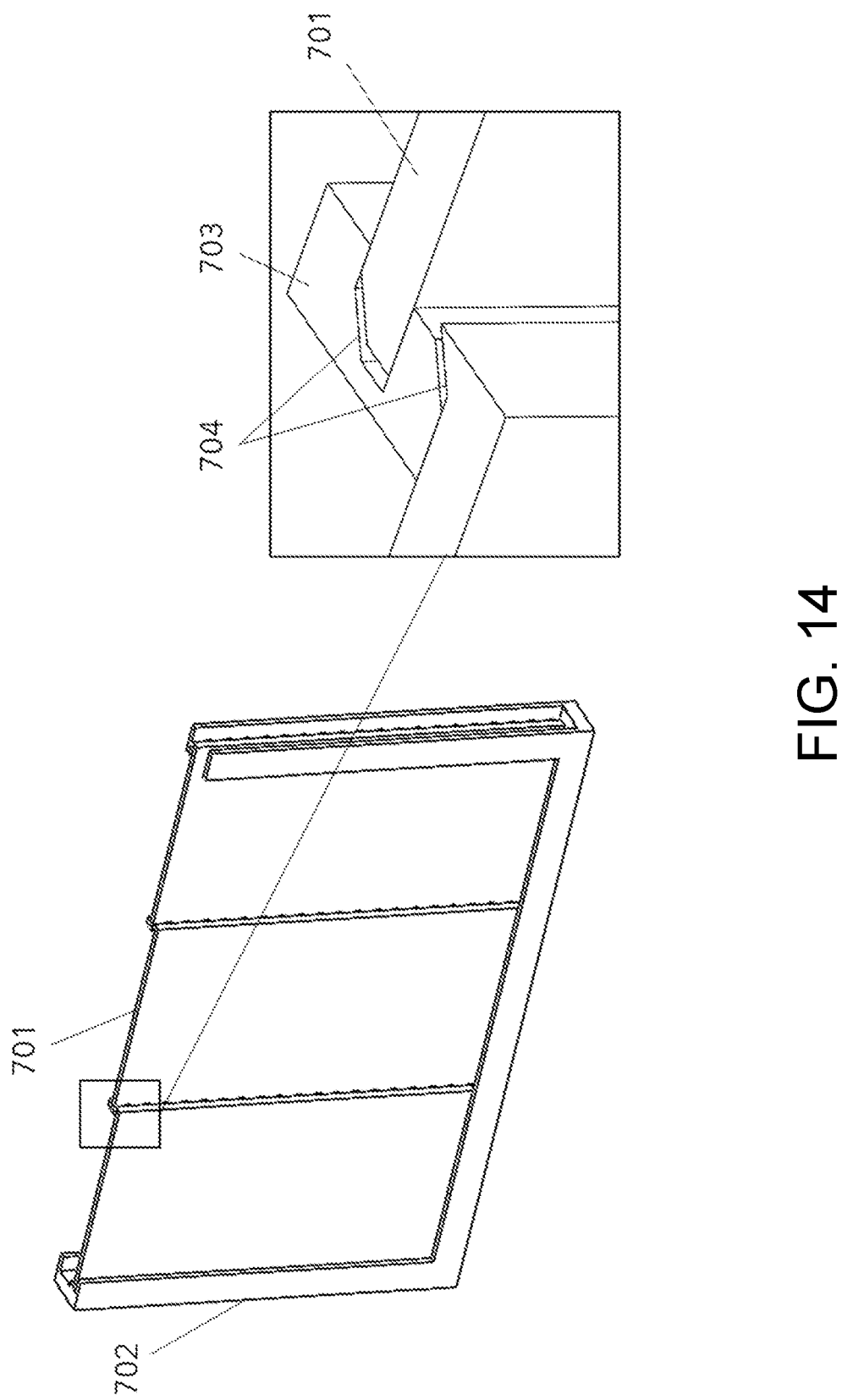
FIG. 14 shows an exemplary sliding door valve sealing mechanism in accordance with the invention.

In one exemplary embodiment, as shown in FIG. 14, the panes come to rest against vertical columns (703) that provide sealing surfaces (704) that seal the valve on all sides. In some example embodiments, the valve elements are stowed outside of the frame to minimize flow obstruction when open. Each sliding valve element can be moved into position by a pneumatic or by hydraulic actuator, which also provides pressure to keep it pressed firmly against the seal in its resting position. In the case that the valves displace vertically, they can be raised by a cable or by rod and released into their final position under influence of gravity. In some example embodiments, the sliding-door valve comprises 2-8 valve elements. In some exemplary embodiments, the sliding-door valve comprises 2-5 valve elements. In some exemplary embodiments, the sliding-door valve comprises 4 valve elements. In some exemplary embodiments, the sliding-door valve comprises 3 valve elements. In some exemplary embodiments, the sliding-door valve comprises 2 valve elements.

Figure 15B:
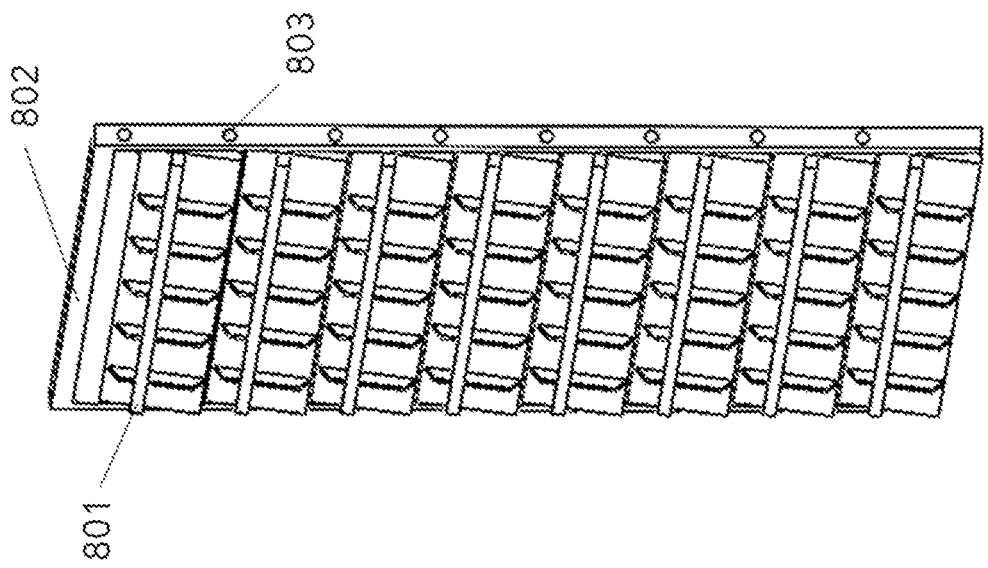
FIG. 15B shows an exemplary louver style valve with end-located hinges in a closed configuration in accordance with the invention.
Figure 15A:
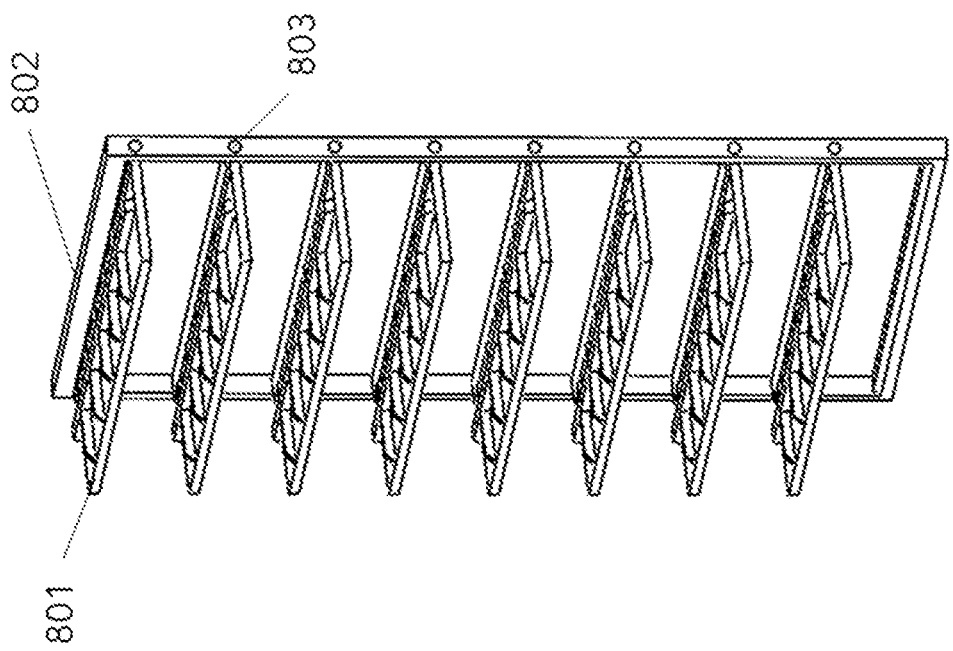
FIG. 15A shows an exemplary louver style valve with end-located hinges in an open configuration in accordance with the invention.

FIGS. 15A and 15B show an exemplary louver style valve. FIG. 15A shows the louver style valve in an open configuration and FIG. 15B shows the louver style valve in a closed configuration. The valve elements (801) rotate about an axis (803), which can be located anywhere along the valve element length. In some exemplary embodiments, the axis is located at an end of the valve element such that the valve element displaces outside the reactor when open and sits relatively flush against the sorbent when closed as shown in FIG. 15B. The frame (802) allows each of these valve elements to rotate freely between open and closed positions. Additional linkages can be included to ensure the valve elements rotate together. As indicated above for other valves, the hinge axis of a louver style valve may be either vertical or horizontal, and the hinge axes of opposing doors need not necessarily be oriented in the same direction.

Figure 16A:
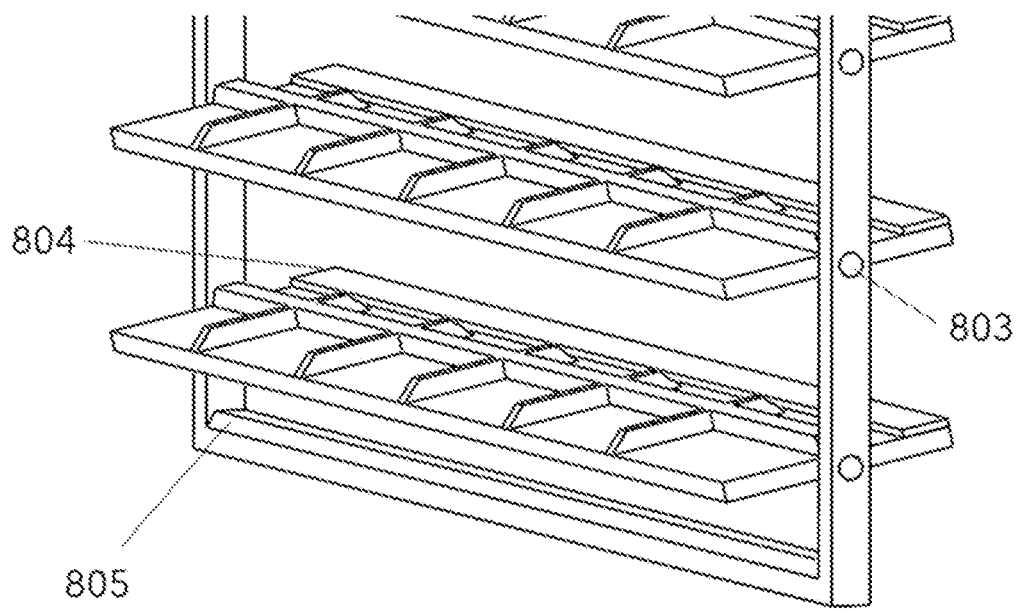
FIG. 16A shows an exemplary louver style valve with center-located hinges in an open configuration in accordance with the invention.
Figure 16B:
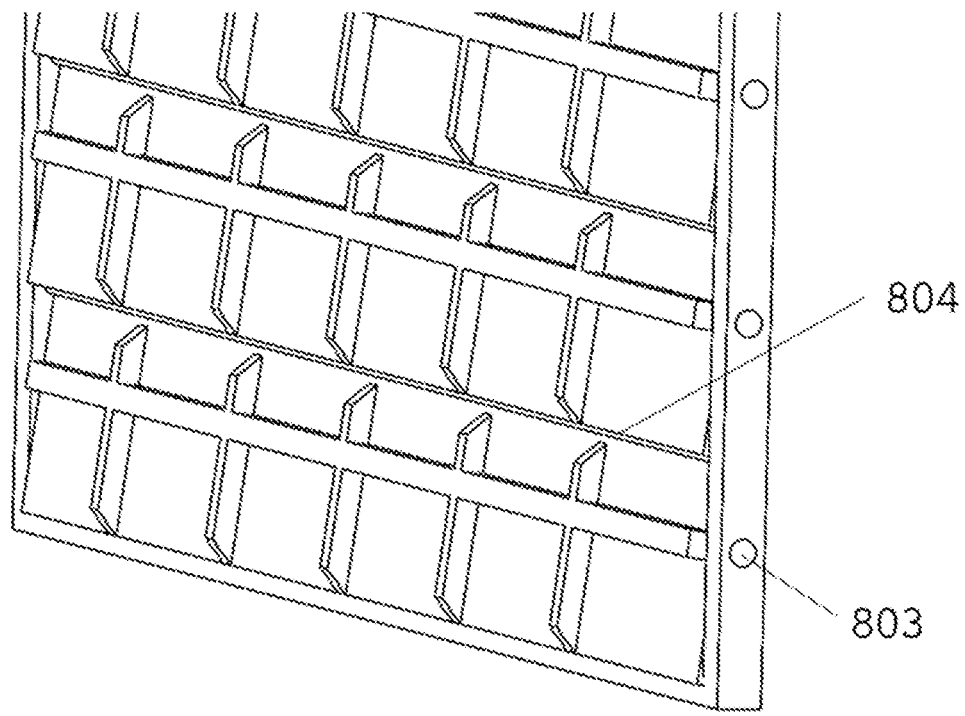
FIG. 16B shows an exemplary louver style valve with center-located hinges in a closed configuration in accordance with the invention.

In some exemplary embodiments, the axis of rotation is located at the center of the valve element as shown in FIGS. 16A and 16B. In some exemplary embodiments, there are sealing surfaces (804) that allow the elements to seal against one another and also sealing surfaces (805) that allow the elements to seal against the frame. The valve elements minimize flow obstruction when open. In some exemplary embodiments, the parallel vanes created by the open louvers improve flow distribution through the sorbent at the expense of some pressure drop. Actuation can be achieved by a pneumatic or hydraulic piston attached to a linkage that in turn attaches to each of the valve elements. It can also be achieved via rack and pinion where each of the valve elements has a pinion at the end that is rotated by a shared or individual rack. Lastly, the rotation can be achieved by a motor or released weight. In some exemplary embodiments, the louver style valve comprises 2-20 valve elements. In some exemplary embodiments, the louver style valve comprises 4-20 valve elements. In some exemplary embodiments, the louver style valve comprises 5-15 valve elements. In some exemplary embodiments, the louver style valve comprises 6 valve elements. In some exemplary embodiments, the louver style valve comprises 8 valve elements.

Figure 17A:
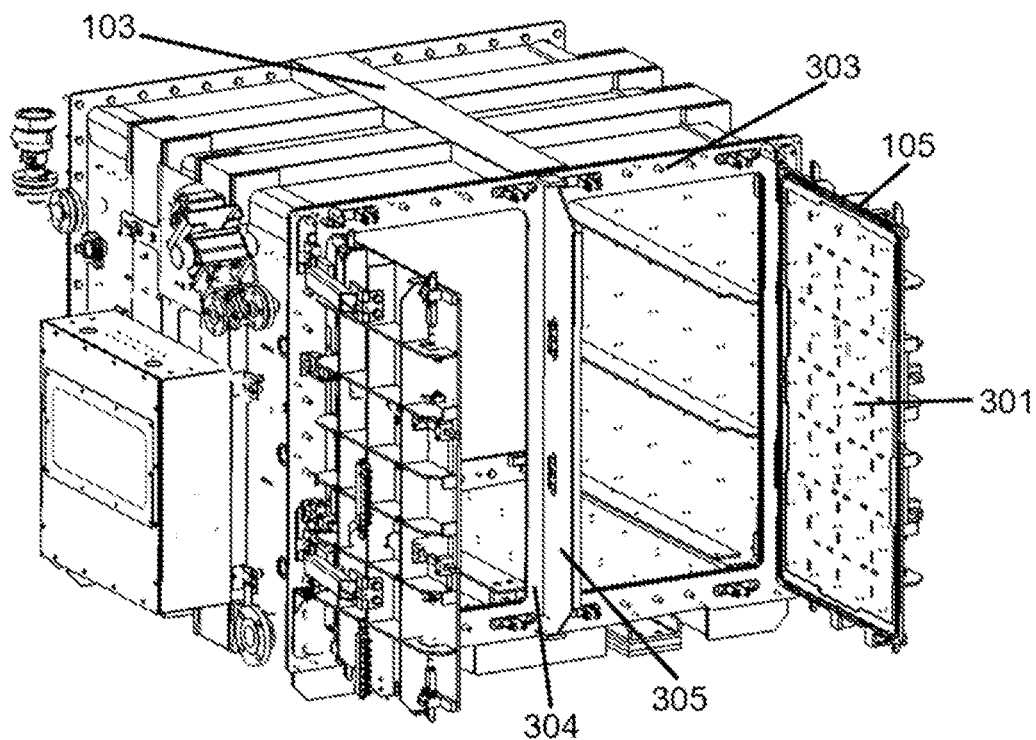
FIG. 17A shows an isometric view of an exemplary double-door valve in an open configuration in accordance with the invention.
Figure 17B:
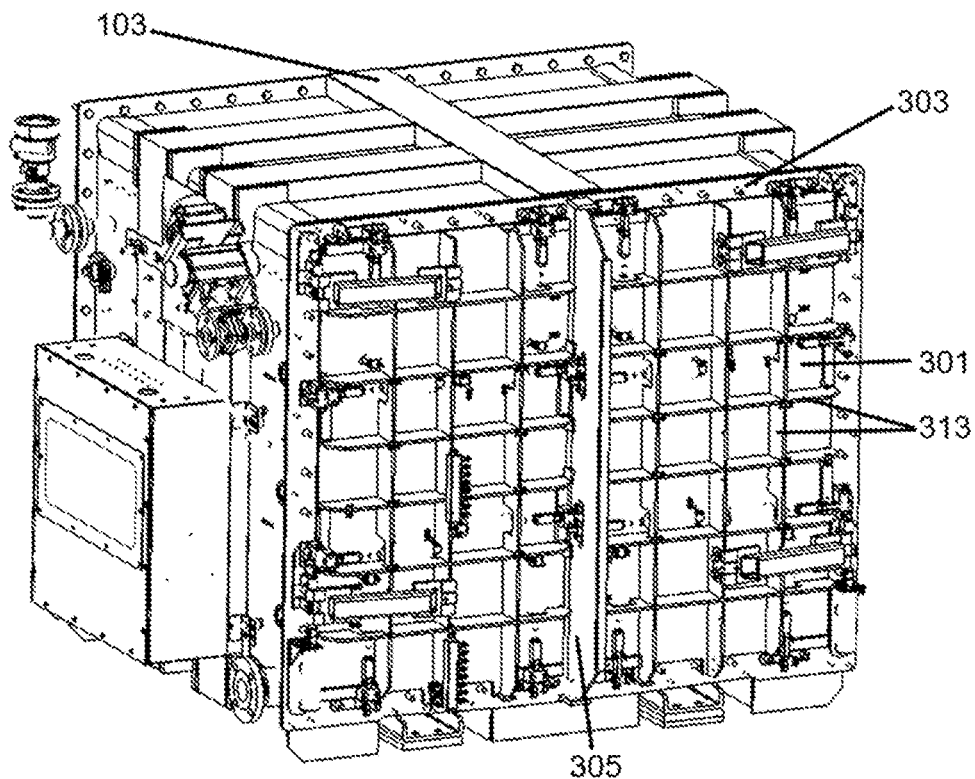
FIG. 17B shows an isometric view of an exemplary double-door valve in a closed configuration in accordance with the invention.
Figure 17C:
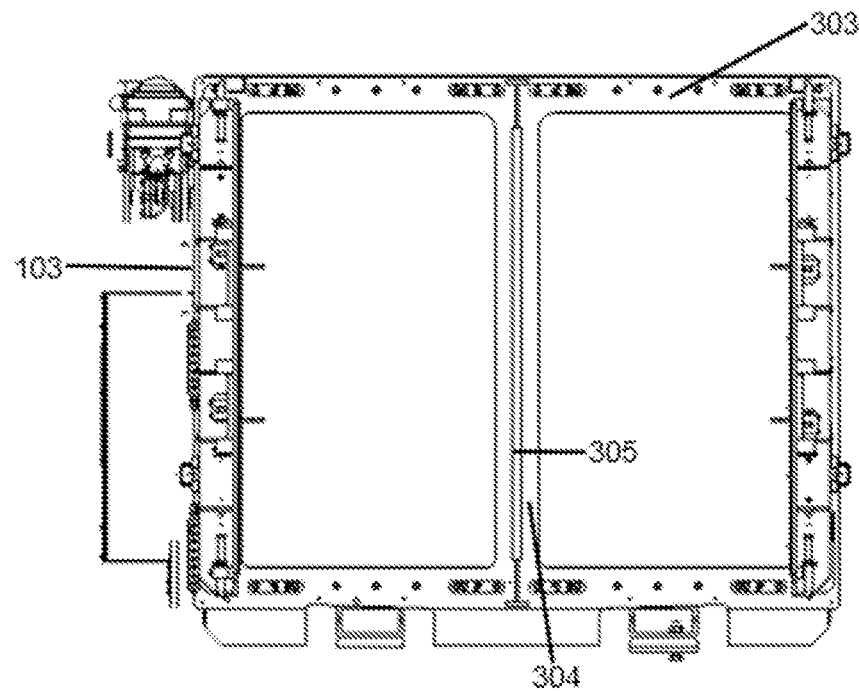
FIG. 17C shows a frontal view of an exemplary double-door valve in an open configuration in accordance with the invention.
Figure 17D:
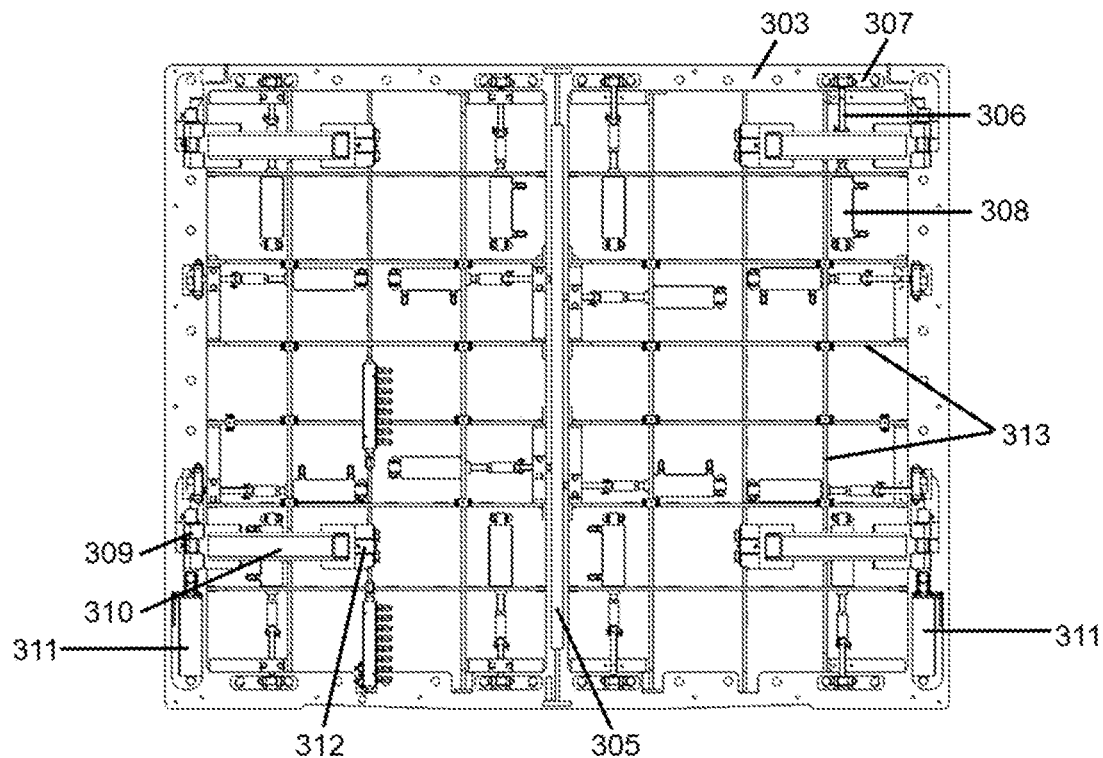
FIG. 17D shows a frontal view of an exemplary double-door valve in a closed configuration in accordance with the invention.
Figure 17E:
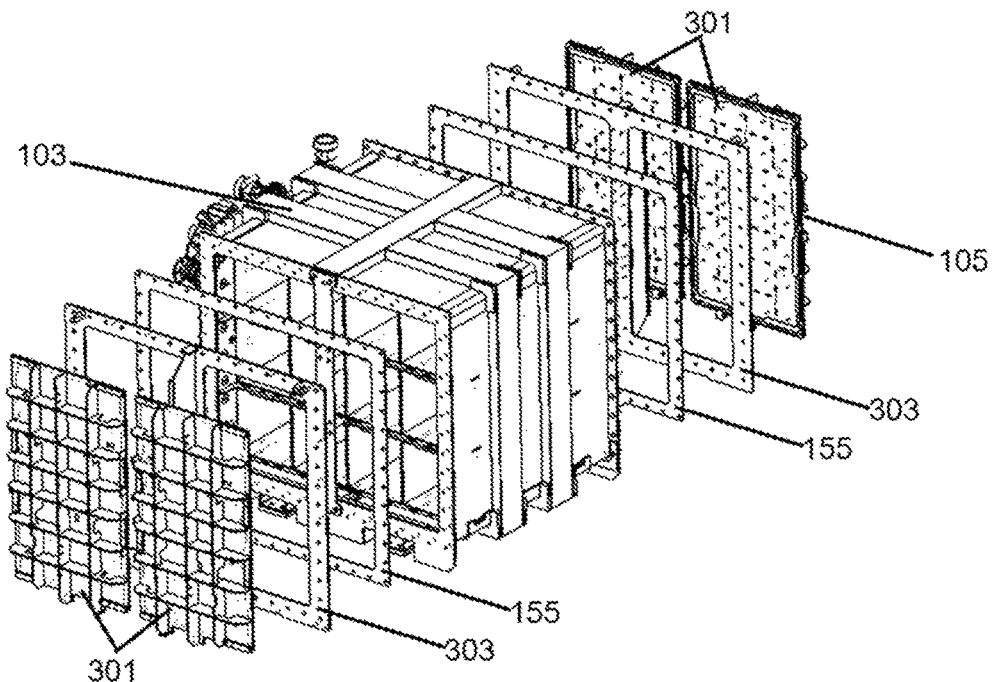
FIG. 17E shows an exploded view of an exemplary double-door valve, valve frame, sealing element, and reactor in accordance with the invention.
Figure 18A:
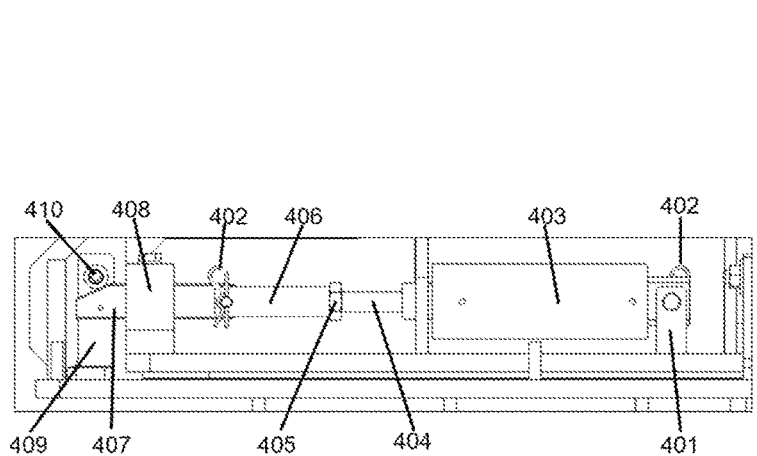
FIG. 18A shows a view of a clamping mechanism made integral with an exemplary double-door valve in between a latched and an unlatched configuration in accordance with the invention.
Figure 18B:
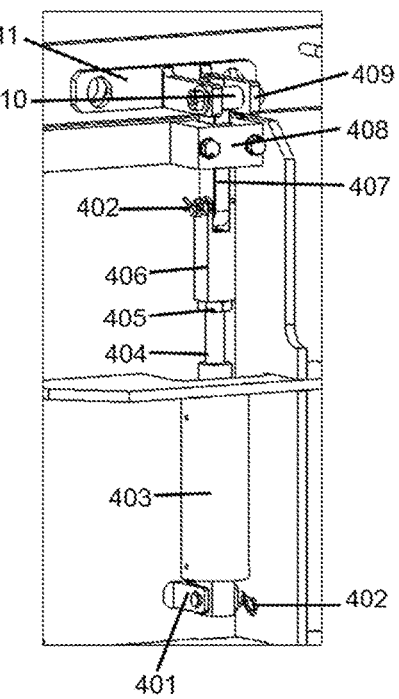
FIG. 18B shows an isometric view of a clamping mechanism made integral with an exemplary double-door valve in between a latched and an unlatched configuration in accordance with the invention.
Figure 18C:
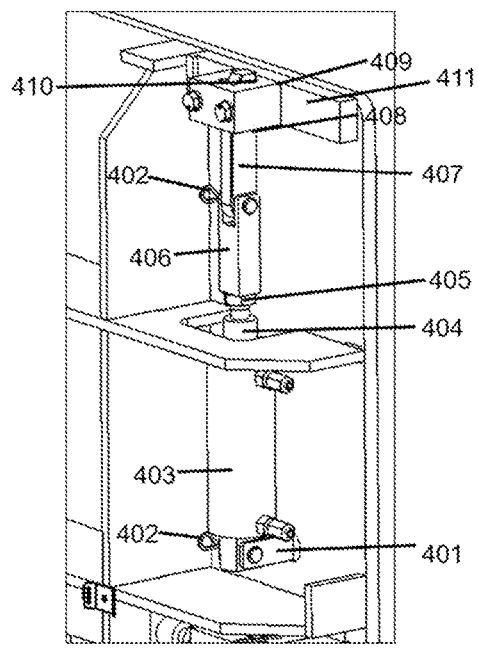
FIG. 18C shows an isometric view of a clamping mechanism made integral with an exemplary double-door valve in an unlatched configuration in accordance with the invention.
Figure 18D:
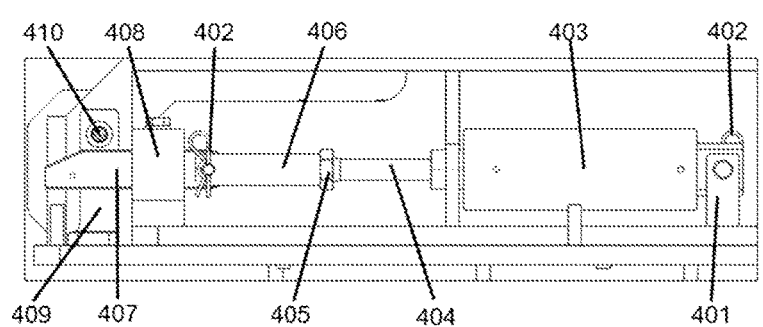
FIG. 18D shows a profile view of a clamping mechanism made integral with an exemplary double-door valve in a latched configuration in accordance with the invention.
Figure 18E:
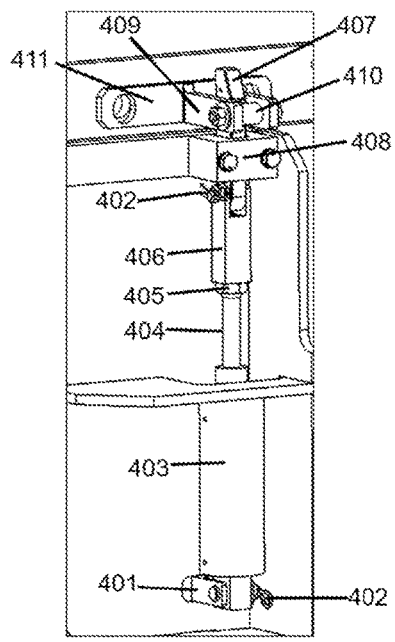
FIG. 18E shows an isometric view of a clamping mechanism made integral with an exemplary double-door valve in a latched configuration in accordance with the invention.

FIGS. 17A, 17B, 17C, 17D, and 17E show an exemplary embodiment of a double-door valve having two valve elements (301), wherein a seal is created when both valve elements contact a middle sill or post (304) attached to the valve frame. In FIG. 17A an isometric view of a reactor (103) is provided. The reactor comprises said valve elements (301) of a double-door valve in the open position. FIG. 17B shows an isometric view of the same reactor with the double-door valve in the closed position. FIG. 17C shows a frontal view of the same reactor with the double-door valve in the open position. FIG. 17D shows a frontal view of the same reactor with the double-door valve in the closed position. FIG. 17E shows an exploded view of the same reactor with two double-door valves disposed on opposite sides of said reactor. In some exemplary embodiments, each valve element comprises hinges, actuation mechanisms, structural elements, and sealing elements. In some exemplary embodiments, each valve element articulates around at least one frame-side hinge (309) disposed on the frame (303) of a reactor opening. In some exemplary embodiments, each valve element has a double-hinged retaining arm (310) that articulates around a frame-side hinge (309) and at least one door-side hinge (312) disposed on the valve element. In some exemplary embodiments, the actuation mechanisms comprise at least one primary actuation mechanism (311) for rotating the valve element about an axis and at least one secondary actuation mechanism (308) for actuating at least one clamping mechanism (306). In some exemplary embodiments, the primary actuation mechanism (311) is a motor. In some exemplary embodiments, the secondary actuation mechanism (308) is a pneumatically driven cylinder or an electrical linear actuator. In some exemplary embodiments, the clamping mechanisms comprise receiver assemblies (307). In some exemplary embodiments, structural elements may comprise a plurality of ribs or baffles (313) made integral with, and oriented to, the valve elements. The orientation of the ribs or baffles may be orthogonal to the valve elements or disposed at other various angles. Ribs or baffles provide the door valve with additional structural rigidity.

In some exemplary embodiments, the structural elements may further comprise a middle rib or baffle (305) made integral with, and orthogonal to, said middle sill or post, wherein the middle sill or post has a surface area coplanar with the valve frame, and wherein the area of the middle sill or post takes up or fills 20% or less of the rectangular area through which air flows in and out of the reactor. In some exemplary embodiments, the middle sill or post takes up, fills, or occupies 10% or less of said rectangular area. Another way of defining this metric is that the open-air area of the reactor with the valve elements in the open position is at least 80% of the rectangular area of the valve frame. In some exemplary embodiments, the open-air area of the reactor with the valve elements in the open position is at least 60% of the rectangular area of the valve frame. This ratio created by the combination of features that comprise the exemplary double-door valve of the present invention provide engineering benefits constituting unexpected and novel results. Experimental findings from simulating and testing an exemplary double-door valve in accordance with the present invention found that when installed on a reactor containing a sorbent, wherein the sorbent filled the interior of the reactor to minimize dead space, airflow distribution was improved when compared to prior valve designs known in the art. A door valve that minimizes dead space in a reactor, defined as the area inside the reactor not taken up by the sorbent, provides for a more efficient direct air capture process for sequestering carbon dioxide, as less volume of air is evacuated during thermal vacuum cycles. In this application, airflow distribution can be defined as the standard deviation of airflow velocity into the sorbent plotted over a cross-section of the sorbent that is perpendicular to the airflow. An exemplary rectangular double door valve with a center sill exhibiting an open-air ratio greater than 90% installed on an adsorbent reactor, resulted in an observed standard deviation of airflow velocity that was 40% lower than that through a butterfly valve installed on the same system. This represents a marked improvement in uniform airflow distribution for sorbent reactors, thereby improving the efficiency of said systems. A door valve that maximizes the aperture area for airflow over the sorbent provides for a more efficient direct air capture process because wider airflow apertures provide for more uniform exposure of sorbent to air and a more uniform gradient of carbon dioxide adsorption by the sorbent bed. This has the benefit that different localized portions of the sorbent bed will become saturated at similar rates, thereby lowering the amount of time required for thermal vacuum cycles and sorbent capacity regeneration. A door valve designed to open as quickly as possible will present its maximum aperture area to airflow rapidly and provide for a more efficient direct air capture process because the sorbents can be cooled faster by the airflow during the desorption process. Cooling the sorbent quickly is critical if airflow is being used to shed heat, as sorbents can degrade over time from exposure to oxygen at elevated temperatures.

In some exemplary embodiments the sealing elements comprise an elastomeric, compressible material, such as a gasket or an O-ring. In some exemplary embodiments of the double-door valve as shown in the exploded view of FIG. 17E, the valve elements (301) are attached to a valve frame (303). A sealing element (105) may be disposed between the valve elements (301) and the valve frame (303). A sealing element (155) may further be disposed between the valve frame (303) and the reactor body (103).

In some exemplary embodiments, the ribs or baffles (313) may be formed of the same material as the valve elements (301). In some exemplary embodiments, the ribs or baffles are mounted to the valve elements via plug welds, or any other suitable means known in the art. The purpose of the ribs or baffles (313) is to lessen the stress on the reactor in the presence of high positive pressure or negative pressure. In one exemplary embodiment, the ribs or baffles (313) are formed vertically on the valve elements (301). In another exemplary embodiment, the ribs or baffles (313) are formed both vertically and horizontally on the valve elements (301) in a crosshatch pattern. Any combination of ribs or baffles may be deposited on the valve elements. In another exemplary embodiment, each valve element comprises three vertical baffles and three horizontal baffles. In other exemplary embodiments, the ribs or baffles do not extend farther than the perimeter of the valve element. In other exemplary embodiments, the ribs or baffles do not extend to the perimeter of the valve element at all. In some exemplary embodiments, the ribs or baffles do extend farther than the perimeter of the valve element and contact the body of the reactor when the door valve is in a closed position, providing additional structural support under pressurized or vacuum conditions.

FIGS. 18A, 18B, 18C, 18D, and 18E show different views of a clamping mechanism of an exemplary double-door valve in a plurality of positions from open to closed. The clamping mechanism may comprise a cylinder (403) having a shaft (404) connected to a cylinder cap bracket (406), a support bracket (401) connected to the cylinder via a first bracket pin (402), a collar (408) connected to the valve element and forming a hollow passthrough, and a latch (407) made integral with the collar and having a leading ramp edge. The leading ramp edge of the latch (407) is configured to enter the hollow passthrough of the collar and make contact with the collar. The cylinder shaft (404) may be made integral with a threaded jam nut (405), wherein the jam nut is disposed between the cylinder (403) and the cylinder cap (406) and provides a means for adjusting the extension length of the cylinder shaft (404) and the latch (407). The collar (408) reduces backlash in the latch and maintains the cylinder level and parallel with the valve element, facilitating uniform compression of the sealing element by the frame when the valve element is closed.

The clamping mechanism may further comprise a receiver assembly, also shown in FIGS. 18A, 18B, 18C, 18D, and 18E. The receiver assembly may comprise a receiver sleeve (410) and a receiver bracket (409). The receiver bracket (409) may comprise at least one bracket tab (411) extending lengthwise from the bracket base. Holes may be formed in the bracket tabs through which a receiver pin can be inserted (not shown). The receiver sleeve (410) may be solid or hollow and formed from a cylindrical shape having a center axis. The receiver sleeve (410) is preferably oriented such that its center axis is orthogonal to the actuation axis of the leading ramp edge of the latch (407), wherein the latch translates linearly along its actuation axis when actuated. When the valve element is in the closed position, the surface of the cylindrical receiver sleeve (410) may be the acting surface for application of force when the ramped leading edge of the latch (407) becomes tangent to the receiver sleeve. As the valve element is closed, the sealing element compresses, and the latch (407) slides under the receiver sleeve (410) and may rotate the sleeve.

The secondary actuation mechanism may be rods or pistons actuated via mechanical, electronic, or pneumatic means or by other means known in the art. The secondary actuation mechanism may be a pneumatic actuator comprising a cylinder (403), a retaining nut, and a threaded jam nut (405). The cylinder may be supported and attached to the valve element via a support bracket (401). The support bracket may be welded to the valve element. The cylinder may be attached to the support bracket via a second bracket pin (402) such as a cotter pin, which allows for removal of the cylinder during maintenance.

Figure 19A:
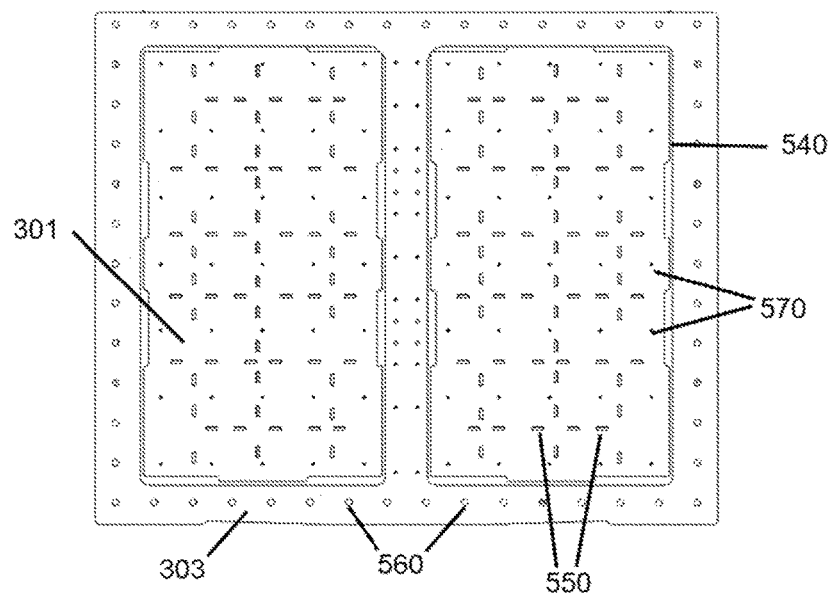
FIG. 19A shows the back, interior-facing view of an exemplary double-door valve in a closed configuration in accordance with the invention.
Figure 19B:
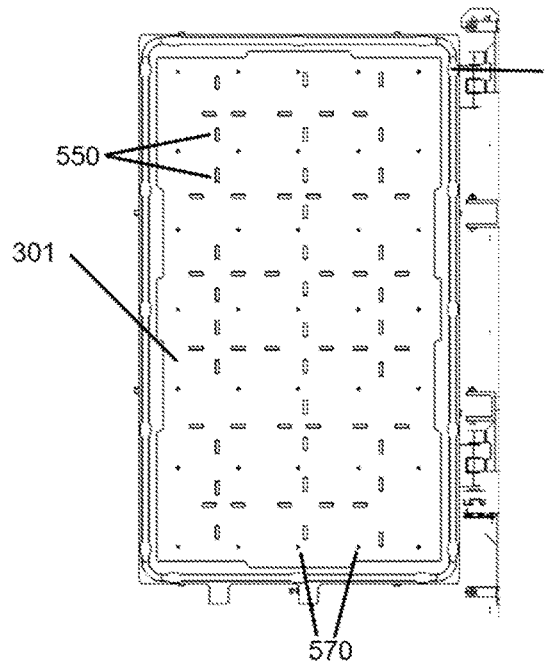
FIG. 19B shows the back interior-facing view of a valve element in accordance with the invention.
Figure 19C:
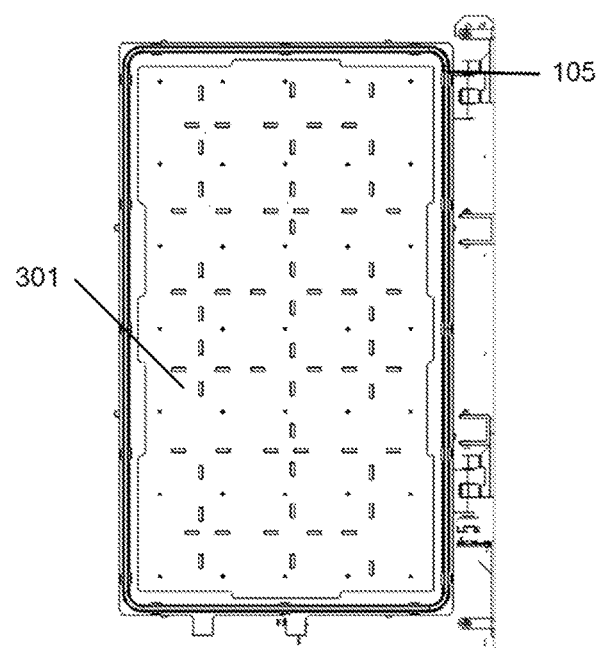
FIG. 19C shows the back interior-facing view of a valve element in accordance with the invention.

FIGS. 19A, 19B, and 19C show the back, reactor-interior-facing view of an exemplary double-door valve in a closed configuration. FIG. 19A shows the double-door valve elements (301) in the closed position and mounted to valve frame (303). FIG. 19B shows the back of a single valve element detached from the valve frame and having a groove (540) for retaining a sealing element and formed in the body of the valve element along the perimeter of the valve element's reactor-facing surface. FIG. 19C shows the back of a single valve element detached from the valve frame and having a sealing element disposed in the groove. Because the valve element is in the closed position in FIG. 19A, the groove and the sealing element are not visible in the image (they are behind the edges of the frame). Because the deposited sealing element is shown in FIG. 19C, the groove is not visible in the image (it is behind the sealing element). Ribs or baffles may be spot welded to the valve element at welding locations (550). The double-door valve frame (303) may comprise mounting holes (560) for integration with the reactor. The double-door valve may comprise studs (570) for mounting thermal insulation (not shown).

Figure 20:
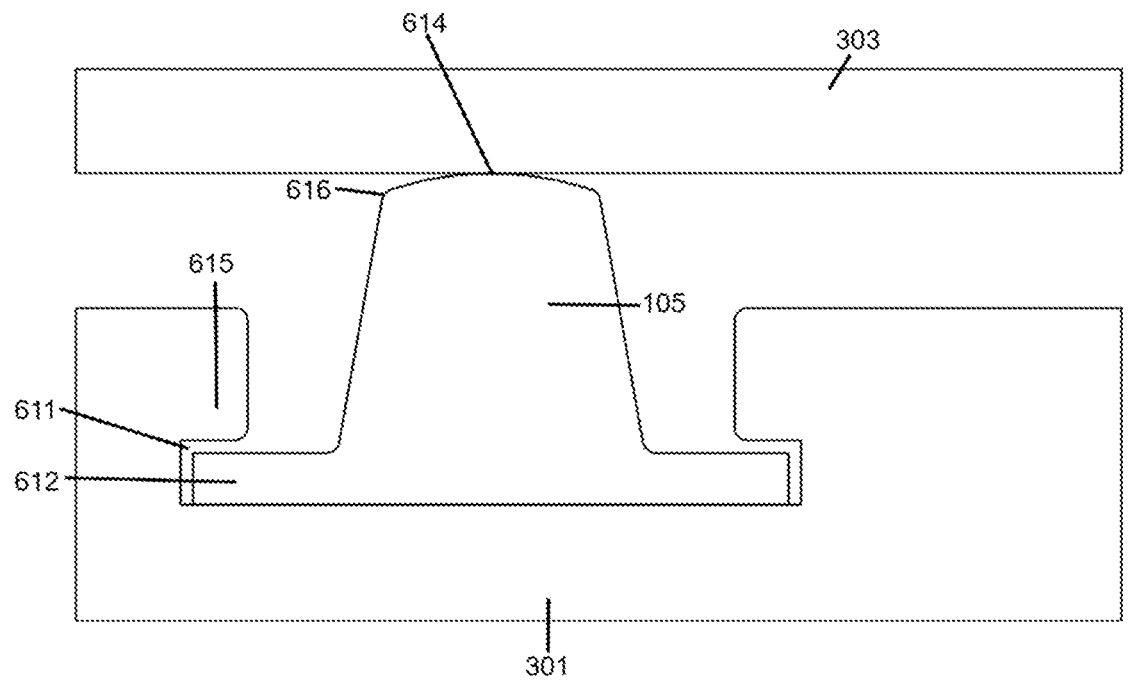
FIG. 20 shows a cross-section of an exemplary tabbed gasket feature for use with a door valve having a rounded protrusion element in accordance with the invention.

FIG. 20 shows a cross-section of an exemplary tabbed sealing element for use with a door valve and having a rounded protrusion. In some exemplary embodiments, grooves in the valve elements (301) have a cavity (601) and an overhanging lip (615), wherein the sealing element (105), such as a gasket or suitable elastomeric material, is disposed within the cavity. In another exemplary embodiment, the cross-section of the cavity has a trapezoidal shape or another suitable shape that retains the sealing element (105) and facilitates compression of the sealing element when it contacts the valve frame (303). The sealing element may comprise a base (612) and at least one protrusion (616), wherein the base is wider than the protrusion, and the opposite ends of the base form tabs or extensions. In some exemplary embodiments, the base (612) of the sealing element is disposed in the cavity (611), and the tabs are disposed underneath the overhanging lip (615). In some exemplary embodiments, the protrusion (616) extends away from the valve element (301) and makes first contact with the valve frame (103) when the reactor door is in the closed position. In some exemplary embodiments, the protrusion of the sealing element has a rounded tip (614) for minimizing the initial contact between the sealing element and the valve frame. In some exemplary embodiments, the protrusions of the sealing element have a square tip. Sealing elements with protrusions in accordance with the invention have the benefit of reducing the force required to initiate sealing and helps the sealing material to unstick from the frame after being compressed. In some exemplary embodiments, the sealing element is held in place within the cavity by a retaining wire disposed through the cross-section of the sealing element and attached to the valve element or the valve frame.

Figure 21:
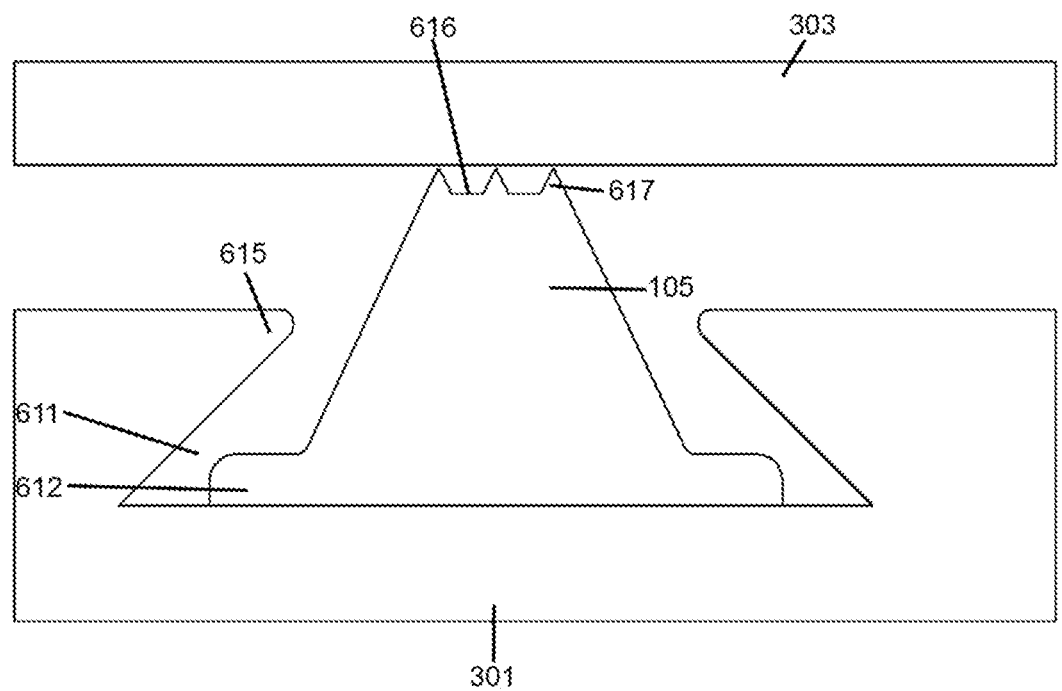
FIG. 21 shows a cross-section of an exemplary tabbed gasket feature for use with a door valve having a serrated protrusion element in accordance with the invention.

FIG. 21 shows a cross-section of an exemplary tabbed sealing element for use with a door valve and having a pointed protrusion. In some exemplary embodiments, the protrusion (616) may have a pointed end having a plurality of crenellations, nodules, or serrations. In some exemplary embodiments, the protrusion (616) of the sealing element comprises a plurality of serrated teeth (617).

Figure 22A:
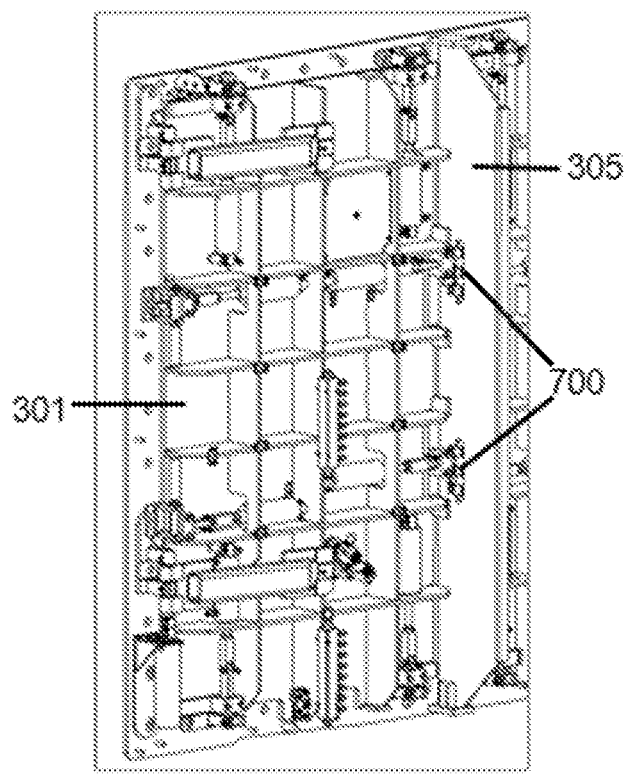
FIG. 22A shows an isometric view of a middle sill disposed between the valves of an exemplary double-door valve in accordance with the invention.
Figure 22B:
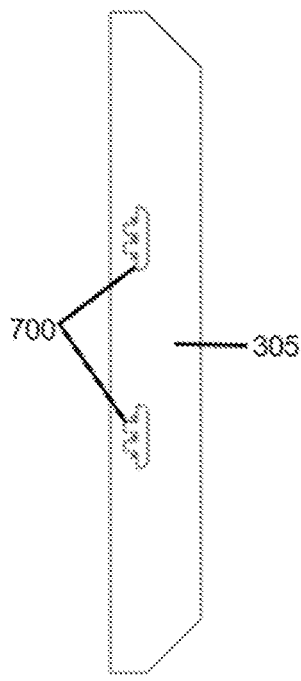
FIG. 22B shows a profile view of an exemplary rib disposed on the middle sill of a valve in accordance with the invention.

FIG. 22A and FIG. 22B show a center sill disposed on an exemplary valve of the present invention. FIG. 22A shows the center sill made integral with a valve frame of an exemplary double-door valve. FIG. 22B shows a profile view of an exemplary middle rib. The center sill may comprise a middle baffle or rib (305) having a base section and a top section, wherein the top section is wider than the base section and the cross-section of the rib or baffle forms a T-shape. In some exemplary embodiments, the middle baffle or rib has a base section, and a top section, wherein the cross-section of the rib or baffle forms an I-shape. The center sill rib may have at least one cutout (700) on its transverse face, wherein the cutouts share a directional axis with each of at least one pair of clamping mechanisms. The cutout (700) may be a hole that is cut, punched, stamped, or machined through the transverse face of the middle section of the rib (305). When a clamping mechanism is actuated, the leading ramp edge of the latch (507) may extend through the cutout (700). The cutouts create space for receiving mechanisms without expanding the footprint of the center sill, thereby being more space efficient and minimizing adverse impacts to airflow distribution and pressure drop. In this way, the center sill is designed to accommodate the actuation movement of the clamping mechanism when the reactor valve is in the closed position while providing structural support with reduced material cost.

Figure 23A:
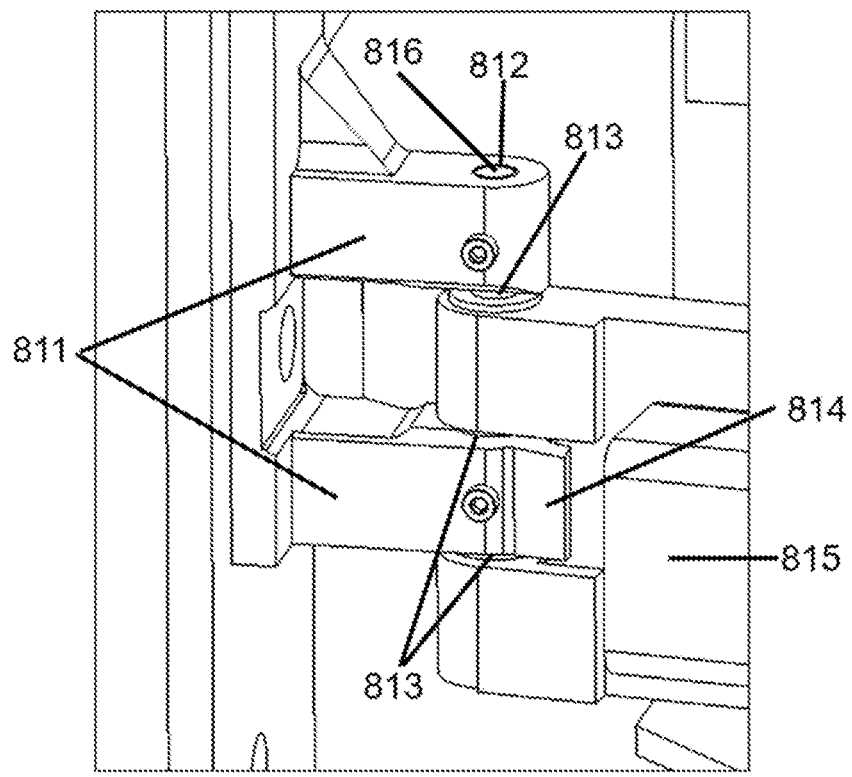
FIG. 23A shows an inset view of a frame-side hinge of an exemplary valve in accordance with the invention.
Figure 23B:
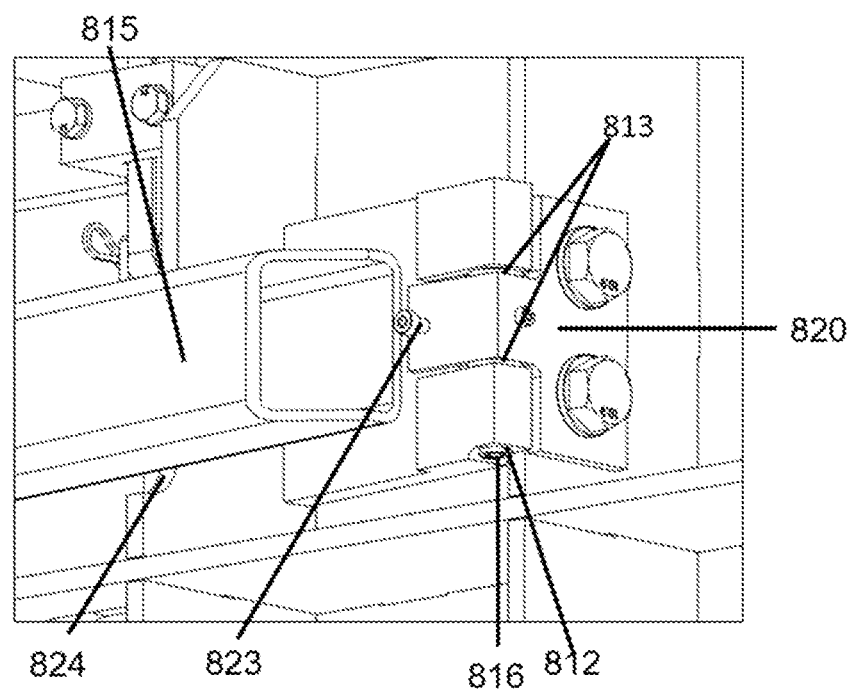
FIG. 23B shows an inset view of a door-side hinge of an exemplary valve in accordance with the invention.

FIG. 23A and FIG. 23B show views of a hinge mechanism of an exemplary valve. FIG. 23A shows an inset view of a frame-side hinge (811) and FIG. 23B shows an inset view of a door-side hinge (820). A retaining arm (815) is configured to rotate about both the frame-side hinge and the door-side hinge. The connected combination of the frame-side hinge (811), the door-side hinge (820), and the retaining arm (815) translate linear force into the compression of the sealing element while maintaining the position and orientation of the one or more rectangular valve elements. The combination thereof further provides structural support to the valve element and allows for the valve element to align a sealing element with the valve element prior to compression of the sealing element, providing for a better seal, reducing risk of damage to the sealing element, and facilitating easier rotation of the valve door about its hinges. The combination thereof further mitigates any deleterious wedging effects wherein the sealing element, such as a gasket, contacts the valve frame at one side first, stopping the motion of the valve element prematurely and unevenly compressing the sealing element around the perimeter of the valve frame, leading to an ineffective seal and/or decreased life of the sealing element. Each of the frame-side hinges (811) and the door-side hinges (820) may comprise pins (816) that pass through at least one thrust bearing (813) and at least one sleeve bearing (812). The thrust bearings (813) support the weight of the valve element and the sleeve bearings (812) reduce the friction of the pins (816) as the valve element rotates about the frame-side hinge (811) and the retaining arm (815) rotates about the door-side hinge (820). In some exemplary embodiments, the door side hinge (820) comprises both top and bottom thrust bearings (813) and top and bottom sleeve bearings (812). In some exemplary embodiments, the frame-side hinge comprises top, middle, and bottom thrust bearings (813) and top and bottom sleeve bearings (812). In some exemplary embodiments, the frame-side hinge comprises more thrust bearings than the door-side hinge because it experiences more loading force than the door side hinge. In some exemplary embodiments, the hinge mechanism further comprises a means for preventing the over-rotation of the valve assembly about its hinges. In some exemplary embodiments, the door-side hinge comprises a first hard stop (824). In some exemplary embodiments, the first hard stop (824) may be formed of a rib or baffle having a cut-away portion. The height of the cut-away portion controls the range of rotation of the door about the door-side hinge axis before being stopped. In some exemplary embodiments, the door-side hinge may comprise a second hard stop (823). In some exemplary embodiments, the second hard stop (823) comprises an adjustable fastener, such as a setscrew. The protruding depth of the adjustable fastener can be tuned to control the range of rotation of the valve door about the door-side hinge axis. The hard stops (823, 824) impede the rotation of the valve door, maintaining the alignment of the door and frame as the door opens and closes. In some exemplary embodiments, the frame-side hinge comprises a third hard stop (814), formed as a tab on the frame-side hinge (811) that controls the range of motion of the door about the frame-side hinge axis. In some exemplary embodiments, the valve frame itself acts as a fourth hard stop controlling the range of motion of the door about the frame-side hinge axis.

The foregoing detailed description of the certain exemplary embodiments has been provided for the purpose of explaining the principles of the invention and its practical application, thereby enabling others skilled in the art to understand the invention for various embodiments and with various modifications as are suited to the particular use contemplated. This description is not necessarily intended to be exhaustive or to limit the invention to the precise embodiments disclosed. The specification describes specific examples of accomplishing a more general goal that also may be accomplished in another way. Those skilled in the art will appreciate that the features described above can be combined in various ways to form multiple variations of the invention. All of the references cited herein are incorporated by reference in their entirety.

EXEMPLARY EMBODIMENTS OF THE INVENTION

E1. An air treatment apparatus for removing carbon dioxide from the atmosphere, the air treatment apparatus comprising:
an adsorbent reactor chamber comprising a front wall, a rear wall, and side walls;
sorbent provided within the adsorbent reactor chamber;
a first rectangular opening formed in the front wall of the adsorbent reactor chamber;
a second rectangular opening formed in the rear wall of the adsorbent reactor chamber;
a first valve frame affixed around the first rectangular opening;
a second valve frame affixed around the second rectangular opening;
one or more first door valves associated with the front wall, wherein each of the one or more first door valves is configured to actuate between a first open position and a first closed position;
one or more second door valves associated with the rear wall, wherein each of the one or more second door valves is configured to actuate between a second open position and a second closed position;
a first sealing element provided between the one or more first door valves and the first valve frame; and
a second sealing element provided between the one or more second door valves and the second valve frame.

E2. The air treatment apparatus of E1, wherein the first sealing element and the second sealing element each comprise a soft elastomeric material.

E3. The air treatment apparatus of E1, wherein at least one of the first valve frame, the second valve frame, the one or more first door valves, or the one or more second door valves comprise an aluminum or steel alloy.

E4. The air treatment apparatus of E1,
wherein the one or more first door valves include one first door valve,
wherein the one or more second door valves include one second door valve;
wherein the one first door valve is configured to open in a first direction outward from the adsorbent reactor chamber,
wherein the one second door valve is configured to open in a second direction outward from the adsorbent reactor chamber, and
wherein the first direction is different from the second direction.

E5. The air treatment apparatus of E1, further comprising:
a first actuation mechanism coupled with one of the first rectangular door valves;
a second actuation mechanism coupled with another of the first rectangular door valves;
a third actuation mechanism coupled with one of the second rectangular door valves; and
a fourth actuation mechanism coupled with another of the second rectangular door valves.

E6. The air treatment apparatus of E1, further comprising:
a first attachment structure provided on an outer surface of one first door valve; and
a first hinge coupled with the first attachment structure;
wherein an axis of the first hinge is outside of the first valve frame, and
wherein the first hinge is configured such that the one first door valve opens in a direction outward from the adsorbent reactor chamber.

E7. The air treatment apparatus of E1,
wherein the one or more first door valves comprise a first rectangular element and a second rectangular element,
wherein the first rectangular element and the second rectangular element of the first door valve are attached at opposite sides of the first valve frame,
wherein the one or more second door valves comprise a third rectangular element and a fourth rectangular element,
wherein the third rectangular element and the fourth rectangular element are attached at opposite sides of the second valve frame,
wherein the first rectangular element and the second rectangular element are each configured to open in a first direction outward from the adsorbent reactor chamber,
wherein the third rectangular element and the fourth rectangular element are each configured to open in a second direction outward from the adsorbent reactor chamber,
wherein the first direction is different from the second direction,
wherein the first rectangular element comprises a first lip,
wherein the first lip further comprises a sealing element that creates a seal between the first rectangular element and the second rectangular element when the one or more first door valves is closed, and
wherein the third rectangular element comprises a second lip, wherein the second lip further comprises a sealing element that creates a seal between the third rectangular element and the fourth rectangular element when the one or more second door valves is closed.

E8. The air treatment apparatus of E1,
wherein the one or more first door valves comprise a first rectangular element and a second rectangular element,
wherein the first rectangular element and the second rectangular element of the one or more first door valves are attached at a center of the first valve frame,
wherein the one or more second door valves comprise a third rectangular element and a fourth rectangular element,
wherein the third rectangular element and the fourth rectangular element of the one or more second door valves are attached at a center of the second valve frame,
wherein the first rectangular element and the second rectangular element of the one or more first door valves are each configured to open in a first direction outward from the adsorbent reactor chamber,
wherein the third rectangular element and the fourth rectangular element of the one or more second door valves are each configured to open in a second direction outward from the adsorbent reactor chamber, and
wherein the first direction is different from the second direction.

E9. The air treatment apparatus of E1,
wherein the first valve frame comprises a first channel,
wherein the one or more first door valves comprise one or more first rectangular elements attached to each other with a first plurality of hinges in an accordion style configuration,
wherein the one or more first rectangular elements comprise a first rectangular element and a second rectangular element,
wherein the first rectangular element is provided with respect to a first side of the first valve frame,
wherein the second rectangular element comprises a first guide peg associated with the first channel, and
wherein the first guide peg is configured to move along the first channel to open or close the one or more first door valves with respect to the adsorbent reactor chamber.

E10. The air treatment apparatus of E9, wherein the sealing elements between the one or more first rectangular elements are connected to each other by at least one linkage.

E11. The air treatment apparatus of E9,
wherein a second sealing element is provided within a joint between the first rectangular element and the second rectangular element, and
wherein the second sealing element is seated against a protruding feature in an adjacent valve element.

E12. The air treatment apparatus of E1,
wherein the one or more first door valves comprise one first door valve comprising a plurality of valve elements connected to each other via hinges in a sectional roll up style configuration, and
wherein the one first door valve is configured to pass through the first valve frame as the one first door valve actuates between the first open position and the first closed position.

E13. The air treatment apparatus of E12,
wherein the plurality of valve elements of the one first door valve are stored in a plane perpendicular to a valve plane when the one first door valve is in the first open position such that the valve elements do not obstruct a flow of gas through the reactor.

E14. The air treatment apparatus of E1,
wherein the one or more first door valves comprises one first door valve,
wherein the one first door valve is a single sliding-door valve comprising a plurality of valve elements,
wherein the plurality of valve elements are configured to slide linearly past each other through the first valve frame as the one first door valve is actuated between the first open position and the first closed position.

E15. The air treatment apparatus of E14, wherein the plurality of valve elements rest against vertical columns that provide sealing surfaces that seal the one first door valve on all sides when the one first door valve is in the first closed position.

E16. The air treatment apparatus of E1,
wherein the one or more first door valves comprise one first door valve,
wherein the one first door valve is a louver-style valve comprising a plurality of valve elements,
wherein one end of each of the plurality of valve elements is attached to the first valve frame via an axis associated with each of the plurality of valve elements, and
wherein the plurality of valve elements rotate about the axis associated with each of the plurality of valve elements as the one first door valve is articulated between the first open position and the first closed position.

E17. The air treatment apparatus of E16, wherein the axis associated with each of the plurality of valve elements is disposed at a center of each of the plurality of valve elements.

E18. The air treatment apparatus of E16,
wherein the one first door valve comprises linkages that rotate the plurality of valve elements together, and
wherein the plurality of valve elements remain parallel to one another when rotated.

E19. The air treatment apparatus of E1, further comprising:
a primary actuation mechanism configured to rotate the one or more first door elements about an axis,
wherein the primary actuation mechanism is at least one of a motor, a pneumatic cylinder, or a linear actuator.

E20. The air treatment apparatus of E1, wherein the sorbent is disposed such that at least a portion of the sorbent is substantially flush with the one or more first door valves or the one or more second door valves when the one or more first door valves are in the first closed position or the one or more second door valves are in the second closed position, respectively.

The invention claimed is:
1. An air treatment apparatus for removing carbon dioxide from the atmosphere, the air treatment apparatus comprising:
an adsorbent reactor chamber comprising a front wall, a rear wall, and side walls;
sorbent provided within the adsorbent reactor chamber;
a first rectangular opening formed in the front wall of the adsorbent reactor chamber;
a second rectangular opening formed in the rear wall of the adsorbent reactor chamber;
a first valve frame affixed around the first rectangular opening;

a second valve frame affixed around the second rectangular opening;
one or more first door valves associated with the front wall, wherein each of the one or more first door valves is configured to actuate between a first open position and a first closed position;
one or more second door valves associated with the rear wall, wherein each of the one or more second door valves is configured to actuate between a second open position and a second closed position;
a first sealing element provided between the one or more first door valves and the first valve frame; and
a second sealing element provided between the one or more second door valves and the second valve frame.

2. The apparatus of claim 1, wherein the first sealing element and the second sealing element each comprise a soft elastomeric material.

3. The apparatus of claim 1,
wherein the one or more first door valves include one first door valve,
wherein the one or more second door valves include one second door valve;
wherein the one first door valve is configured to open in a first direction outward from the adsorbent reactor chamber,
wherein the one second door valve is configured to open in a second direction outward from the adsorbent reactor chamber, and
wherein the first direction is different from the second direction.

4. The apparatus of claim 1, further comprising:
a first actuation mechanism coupled with one of the first door valves;
a second actuation mechanism coupled with another of the first door valves;
a third actuation mechanism coupled with one of the second door valves; and
a fourth actuation mechanism coupled with another of the second door valves.

5. The apparatus of claim 1, further comprising:
a first attachment structure provided on an outer surface of one first door valve; and
a first hinge coupled with the first attachment structure;
wherein an axis of the first hinge is outside of the first valve frame, and
wherein the first hinge is configured such that the one first door valve opens in a direction outward from the adsorbent reactor chamber.

6. The apparatus of claim 1,
wherein the one or more first door valves comprise a first rectangular element and a second rectangular element,
wherein the first rectangular element and the second rectangular element of the first door valve are attached at opposite sides of the first valve frame,
wherein the one or more second door valves comprise a third rectangular element and a fourth rectangular element,
wherein the third rectangular element and the fourth rectangular element are attached at opposite sides of the second valve frame,
wherein the first rectangular element and the second rectangular element are each configured to open in a first direction outward from the adsorbent reactor chamber,
wherein the third rectangular element and the fourth rectangular element are each configured to open in a second direction outward from the adsorbent reactor chamber,
wherein the first direction is different from the second direction,
wherein the first rectangular element comprises a first lip,
wherein the first lip further comprises a sealing element that creates a seal between the first rectangular element and the second rectangular element when the one or more first door valves is closed, and
wherein the third rectangular element comprises a second lip, wherein the second lip further comprises a sealing element that creates a seal between the third rectangular element and the fourth rectangular element when the one or more second door valves is closed.

7. The apparatus of claim 1,
wherein the one or more first door valves comprise a first rectangular element and a second rectangular element,
wherein the first rectangular element and the second rectangular element of the one or more first door valves are attached at a center of the first valve frame,
wherein the one or more second door valves comprise a third rectangular element and a fourth rectangular element,
wherein the third rectangular element and the fourth rectangular element of the one or more second door valves are attached at a center of the second valve frame,
wherein the first rectangular element and the second rectangular element of the one or more first door valves are each configured to open in a first direction outward from the adsorbent reactor chamber,
wherein the third rectangular element and the fourth rectangular element of the one or more second door valves are each configured to open in a second direction outward from the adsorbent reactor chamber, and
wherein the first direction is different from the second direction.

8. The apparatus of claim 1,
wherein the first valve frame comprises a first channel,
wherein the one or more first door valves comprise one or more first rectangular elements attached to each other with a first plurality of hinges in an accordion style configuration,
wherein the one or more first rectangular elements comprise a first rectangular element and a second rectangular element,
wherein the first rectangular element is provided with respect to a first side of the first valve frame,
wherein the second rectangular element comprises a first guide peg associated with the first channel, and
wherein the first guide peg is configured to move along the first channel to open or close the one or more first door valves with respect to the adsorbent reactor chamber.

9. The apparatus of claim 8, further comprising one or more sealing elements between each of the one or more first rectangular elements,
wherein the one or more sealing elements are connected to each other by at least one linkage.

10. The apparatus of claim 8,
wherein a second sealing element is provided within a joint between the first rectangular element and the second rectangular element, and
wherein the second sealing element is seated against a protruding feature in an adjacent valve element.

11. The apparatus of claim 1,
wherein the one or more first door valves comprise one first door valve comprising a plurality of valve elements connected to each other via hinges in a sectional roll up style configuration, and
wherein the one first door valve is configured to pass through the first valve frame as the one first door valve actuates between the first open position and the first closed position.

12. The apparatus of claim 11, wherein the plurality of valve elements of the one first door valve are stored in a plane perpendicular to a valve plane when the one first door valve is in the first open position such that the valve elements do not obstruct a flow of gas through the reactor.

13. The apparatus of claim 1,
wherein the one or more first door valves comprises one first door valve,
wherein the one first door valve is a single sliding-door valve comprising a plurality of valve elements,
wherein the plurality of valve elements are configured to slide linearly past each other through the first valve frame as the one first door valve is actuated between the first open position and the first closed position.

14. The apparatus of claim 13, wherein the plurality of valve elements rest against vertical columns that provide sealing surfaces that seal the one first door valve on all sides when the one first door valve is in the first closed position.

15. The apparatus of claim 1,
wherein the one or more first door valves comprise one first door valve,
wherein the one first door valve is a louver-style valve comprising a plurality of valve elements,
wherein one end of each of the plurality of valve elements is attached to the first valve frame via an axis associated with each of the plurality of valve elements, and
wherein the plurality of valve elements rotate about the axis associated with each of the plurality of valve elements as the one first door valve is articulated between the first open position and the first closed position.

16. The apparatus of claim 15, wherein the axis associated with each of the plurality of valve elements is disposed at a center of each of the plurality of valve elements.

17. The apparatus of claim 15,
wherein the one first door valve comprises linkages that rotate the plurality of valve elements together, and
wherein the plurality of valve elements remain parallel to one another when rotated.

18. The apparatus of claim 1, further comprising:
a primary actuation mechanism configured to rotate the one or more first door elements about an axis,
wherein the primary actuation mechanism is at least one of a motor, a pneumatic cylinder, or a linear actuator.

19. The apparatus of claim 1, wherein the sorbent is disposed such that at least a portion of the sorbent is substantially flush with the one or more first door valves or the one or more second door valves when the one or more first door valves are in the first closed position or the one or more second door valves are in the second closed position, respectively.

20. The apparatus of claim 1, further comprising:
a first attachment structure provided on an outer surface of one first door valve; and
a first hinge coupled with the first attachment structure;
wherein an axis of the first hinge is offset from the first valve frame, and
wherein an axis of the first hinge is parallel to and offset from an axis of the first door valve, and
wherein the first hinge is configured such that the one first door valve opens in a direction outward from the adsorbent reactor chamber.

* * * * *